(12) United States Patent
Abedini et al.

(10) Patent No.: US 11,743,932 B2
(45) Date of Patent: Aug. 29, 2023

(54) TECHNIQUES FOR RANDOM ACCESS CHANNEL-BASED SELF-INTERFERENCE MEASUREMENT

(71) Applicant: QUALCOMM Incorporated, San Diego, CA (US)

(72) Inventors: Navid Abedini, Basking Ridge, NJ (US); Tao Luo, San Diego, CA (US); Qian Zhang, Basking Ridge, NJ (US); Yan Zhou, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/324,668

(22) Filed: May 19, 2021

(65) Prior Publication Data

US 2021/0392650 A1 Dec. 16, 2021

Related U.S. Application Data

(60) Provisional application No. 63/039,807, filed on Jun. 16, 2020.

(51) Int. Cl.
*H04W 72/541* (2023.01)
*H04W 74/08* (2009.01)
(Continued)

(52) U.S. Cl.
CPC ............. *H04W 72/541* (2023.01); *H04L 5/16* (2013.01); *H04W 52/36* (2013.01);
(Continued)

(58) Field of Classification Search
CPC ............ H04W 74/0816; H04W 16/28; H04W 72/046
See application file for complete search history.

(56) References Cited

U.S. PATENT DOCUMENTS 10,893,544 B2 * 1/2021 Hakola ................ H04W 56/001
11,271,699 B1 * 3/2022 Eyuboglu ............. H04W 80/02
(Continued)

FOREIGN PATENT DOCUMENTS

WO WO-2015077987 A1 * 6/2015 ............... H04L 5/14

OTHER PUBLICATIONS

Apple Inc: "Further Considerations on Beam Management Enhancement", 3GPP Draft, 3GPP TSG RAN WG1 #97, R1-1907344 Further Considerations On Beam Management Enhancement, 3rd Generation Partnership Project (3GPP), Mobile Competence Centre, 650, Route Des Lucioles, F-06921, Sophia-Antipolis C, vol. RAN WG1, No. Reno, USA, May 13, 2019-May 17, 2019 May 13, 2019 (May 13, 2019), XP051728783, 7 Pages, Retrieved from the Internet: URL:http://www.3gpp.org/ftp/Meetings%5F3GPP%5FSYNC/RAN1/Docs/R1%2D1907344%2Ezip [retrieved on May 13, 2019] 6 Beam Management Based on Interference Management.
(Continued)

*Primary Examiner* — Ivan O Latorre
(74) *Attorney, Agent, or Firm* — Dalei Dong; Holland & Hart LLP

(57) ABSTRACT

Methods, systems, and devices for wireless communications are described. A communication device may transmit a random access channel (RACH) signal using a transmit beam of a set of transmit beams. The RACH signal may include a RACH preamble. The communication device may receive, based on the transmitted RACH signal, a receive beam of a set of receive beams. The communication device may determine a level of self-interference of the received beam. For example, the communication device may measure the level of self-interference of the received beam based on the transmitted RACH signal including the RACH preamble. The communication device may operate in a mode based on the determined level of self-interference.

29 Claims, 17 Drawing Sheets

(51) Int. Cl.
  *H04L 5/16*   (2006.01)
  *H04W 52/36*  (2009.01)
  *H04W 72/044* (2023.01)
(52) U.S. Cl.
  CPC ..... *H04W 72/044* (2013.01); *H04W 74/0833* (2013.01); *H04W 74/0866* (2013.01)

(56) References Cited

U.S. PATENT DOCUMENTS

| | | | | |
|---|---|---|---|---|
| 11,375,527 | B1* | 6/2022 | Eyuboglu | H04B 7/15528 |
| 2014/0073337 | A1 | 3/2014 | Hong et al. | |
| 2017/0251460 | A1* | 8/2017 | Agiwal | H04W 72/0406 |
| 2019/0081688 | A1* | 3/2019 | Deenoo | H04L 5/005 |
| 2019/0215048 | A1* | 7/2019 | Cirik | H04B 7/088 |
| 2020/0099439 | A1* | 3/2020 | Mundarath | H04B 17/318 |
| 2020/0413451 | A1* | 12/2020 | Taherzadeh Boroujeni | H04W 74/004 |
| 2021/0127425 | A1* | 4/2021 | Park | H04B 7/0695 |
| 2021/0135770 | A1* | 5/2021 | Schober | H04B 17/14 |
| 2021/0258100 | A1* | 8/2021 | Hassan Hussein | H04W 72/1257 |
| 2021/0344558 | A1* | 11/2021 | Lee | H04B 7/0408 |
| 2021/0352735 | A1* | 11/2021 | Bae | H04L 1/08 |
| 2022/0104267 | A1* | 3/2022 | Gao | H04W 72/1268 |
| 2022/0182160 | A1* | 6/2022 | Su | H04L 27/2691 |
| 2022/0190906 | A1* | 6/2022 | Haghighat | H04W 74/0841 |
| 2022/0217789 | A1* | 7/2022 | Lee | H04W 74/0816 |

OTHER PUBLICATIONS

International Search Report and Written Opinion—PCT/US2021/033353—ISA/EPO—dated Oct. 4, 2021 (205639WO).

Lenovo, et al., "Discussion on Channel Access for NR Beyond 52.6 GHz", 3GPP Draft, 3GPP TSG RAN WG1 # 101-e, R1-2003305, 3rd Generation Partnership Project (3GPP), Mobile Competence Centre, 650, Route Des Lucioles, F-06921 Sophia-Antipolis Cedex, France, vol. RAN WG1, No. E-Meeting, May 25, 2020-Jun. 5, 2020 May 15, 2020 (May 15, 2020), XP051885099, 3 Pages, Retrieved from the Internet: URL:https://ftp.3gpp.org/tsg_ran/WG1_RL1/TSGR1_101-e/Docs/R1-2003305.zip R1-2003305_Lenovo_MotaM_Channel Access_vfinal.docx [retrieved on May 15, 2020] 2.2 Beam and Interference Management in NR-U.

ZTE: "Further Details on Multi-Beam/TRP Operation", 3GPP Draft, 3GPP TSG RAN WG1 Meeting #99, R1-1911933, 3rd Generation Partnership Project (3GPP), Mobile Competence Centre, 650, Route Des Lucioles, F-06921 Sophia-Antipolis Cedex, France, vol. RAN WG1, No. Reno. US, Nov. 18, 2019-Nov. 22, 2019 Nov. 9, 2019 (Nov. 9, 2019), XP051823114, 10 Pages, Retrieved from the Internet: URL: https://ftp.3gpp.org/tsg_ran/WG1_RL1/TSGR1_99/Docs/R1-1911933.zip R1-1911933 Further Details on Multi-Beam and TRP Operation.doc [retrieved on Nov. 9, 2019] 2.3.2 Panel-Specific UL Power Control.

* cited by examiner

TECHNIQUES FOR RANDOM ACCESS CHANNEL-BASED SELF-INTERFERENCE MEASUREMENT

CROSS REFERENCE

The present application for patent claims the benefit of U.S. Provisional Patent Application No. 63/039,807 by Abedini et al., entitled "TECHNIQUES FOR RANDOM ACCESS CHANNEL-BASED SELF-INTERFERENCE MEASUREMENT," filed Jun. 16, 2020, assigned to the assignee hereof, and which is hereby incorporated by reference in its entirety.

FIELD OF DISCLOSURE

The present disclosure, for example, relates to wireless communications and more specifically to techniques for random access channel (RACH) based self-interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support duplex communications, such as half-duplex communications and full-duplex communications. In some cases, these wireless communications systems may experience interference issues due to the half-duplex communications and full-duplex communications, which may affect reliability of the wireless communications systems. As demand for communication efficiency increases, it may be desirable for wireless communications systems, such as 4G and 5G systems to provide improvements to duplex communications to support higher reliability and lower latency duplex operations, among other examples.

SUMMARY

Various aspects of the present disclosure relate to improved methods, systems, devices, and apparatuses that support techniques for random access channel (RACH) based self-interference measurement. The present disclosure provides for configuring a communication device to provide techniques for RACH-based self-interference measurement. The communication device may transmit a RACH signal using a transmit beam of a set of transmit beams. The RACH signal may include, for example, a RACH preamble. The communication device may determine (e.g., measure) a level of self-interference, based on the transmitted RACH signal. For example, the communication device may receive, based on the transmitted RACH signal, a receive beam of a set of receive beams. The communication device may determine a level of self-interference of the received beam. The present disclosure may, as a result, include features for improvements to duplex communications and, in some examples, may promote enhanced efficiency for high reliability and low latency duplex operations in 5G systems, among other benefits.

A method of wireless communication at a device is described. The method may include transmitting a RACH signal using a transmit beam of a set of transmit beams, receiving, based on the transmitted RACH signal, a receive beam of a set of receive beams, determining a level of self-interference of the received beam, and operating in a mode based on the determined level of self-interference.

An apparatus for wireless communication is described. The apparatus may include a processor, memory coupled with the processor, and instructions stored in the memory. The instructions may be executable by the processor to cause the apparatus to transmit a RACH signal using a transmit beam of a set of transmit beams, receive, based on the transmitted RACH signal, a receive beam of a set of receive beams, determine a level of self-interference of the received beam, and operate in a mode based on the determined level of self-interference.

Another apparatus for wireless communication is described. The apparatus may include means for transmitting a RACH signal using a transmit beam of a set of transmit beams, receiving, based on the transmitted RACH signal, a receive beam of a set of receive beams, determining a level of self-interference of the received beam, and operating in a mode based on the determined level of self-interference.

A non-transitory computer-readable medium storing code for wireless communication at a device is described. The code may include instructions executable by a processor to transmit a RACH signal using a transmit beam of a set of transmit beams, receive, based on the transmitted RACH signal, a receive beam of a set of receive beams, determine a level of self-interference of the received beam, and operate in a mode based on the determined level of self-interference.

Some examples of the method, apparatuses, and non-transitory computer-readable medium described herein may further include operations, features, means, or instructions for determining a RACH configuration, where determining the level of self-interference includes determining the level of self-interference of the received beam based on the RACH configuration.

Some examples of the method, apparatuses, and non-transitory computer-readable medium described herein may further include operations, features, means, or instructions for receiving from a network device a message including the RACH configuration, where determining the level of self-interference includes determining the level of self-interference of the received beam based on the received message from the network device.

Some examples of the method, apparatuses, and non-transitory computer-readable medium described herein may further include operations, features, means, or instructions for determining a transmit power level of the RACH signal based on the RACH configuration, where transmitting the RACH signal includes transmitting the RACH signal using the transmit beam of the set of transmit beams based on the determined transmit power level of the RACH signal.

Some examples of the method, apparatuses, and non-transitory computer-readable medium described herein may further include operations, features, means, or instructions for determining a timing advance associated with the RACH signal based on one or more timing advances associated with one or more uplink transmissions, where transmitting the RACH signal includes transmitting the RACH signal using the transmit beam of the set of transmit beams based on the timing advance, where the timing advance associated with the RACH signal and the one or more timing advances associated with the one or more uplink transmissions may be the same.

Some examples of the method, apparatuses, and non-transitory computer-readable medium described herein may further include operations, features, means, or instructions for receiving a message including an indication of a timing advance associated with the RACH signal, where transmitting the RACH signal includes transmitting the RACH signal using the transmit beam of the set of transmit beams based on the timing advance indicated in the received message, where the timing advance associated with the RACH signal may be different from one or more timing advances associated with one or more uplink transmissions.

Some examples of the method, apparatuses, and non-transitory computer-readable medium described herein may further include operations, features, means, or instructions for selecting a preamble format associated with the RACH signal based on a timing offset, where transmitting the RACH signal includes transmitting the RACH signal using the transmit beam of the set of transmit beams based on the selected preamble format, where the preamble format includes a short preamble format or a long preamble format.

Some examples of the method, apparatuses, and non-transitory computer-readable medium described herein may further include operations, features, means, or instructions for receiving a message including an indication of a set of preamble identifiers or a set of preamble resources, or both, where the set of preamble resources are associated with one or more reference signals, the one or more reference signals including one or more of a synchronization signal block (SSB), an uplink reference signal, or a downlink reference signal, selecting a preamble identifier of the set of preamble identifiers or a preamble resource of the set of preamble resources, or both, based on the received message, where transmitting the RACH signal includes transmitting the RACH signal using the transmit beam of the set of transmit beams based on the selected preamble identifier or the selected preamble resource, or both, where the RACH signal includes a RACH preamble associated with the selected preamble identifier.

In some examples of the method, apparatuses, and non-transitory computer-readable medium described herein, selecting the preamble identifier of the set of preamble identifiers or the preamble resource of the set of preamble resources, or both, may include operations, features, means, or instructions for randomly selecting the preamble identifier of the set of preamble identifiers or the preamble resource of the set of preamble resources, or both.

In some examples of the method, apparatuses, and non-transitory computer-readable medium described herein, selecting the preamble identifier of the set of preamble identifiers or the preamble resource of the set of preamble resources, or both, may include operations, features, means, or instructions for selecting the preamble identifier of the set of preamble identifiers or the preamble resource of the set of preamble resources, or both, based on a criteria.

Some examples of the method, apparatuses, and non-transitory computer-readable medium described herein may further include operations, features, means, or instructions for selecting a subset of preamble resources of the set of preamble resources, ramping a transmit power level of the RACH signal over one or more RACH periods based on the selected subset of preamble resources of the set of preamble resources, where transmitting the RACH signal includes transmitting the RACH signal using the transmit beam of the set of transmit beams based on ramping the transmit power level of the RACH signal over the one or more RACH periods.

Some examples of the method, apparatuses, and non-transitory computer-readable medium described herein may further include operations, features, means, or instructions for selecting the transmit beam and the receive beam based on determining a quasi-co location relationship between the transmit beam and the receive beam, where transmitting the RACH signal includes, transmitting the RACH signal using the transmit beam of the set of transmit beams based on the determined quasi-co location relationship, where determining the level of self-interference includes determining the level of self-interference of the received beam based on the determined quasi-co location relationship.

Some examples of the method, apparatuses, and non-transitory computer-readable medium described herein may further include operations, features, means, or instructions for receiving a reference signal using the receive beam of the set of receive beams, determining a transmit power level of the RACH signal based on the received reference signal, where transmitting the RACH signal includes transmitting the RACH signal using the transmit beam of the set of transmit beams based on the determined transmit power level of the RACH signal.

Some examples of the method, apparatuses, and non-transitory computer-readable medium described herein may further include operations, features, means, or instructions for receiving a set of reference signals using the set of receive beams, determining a transmit power level of each RACH signal of a set of RACH signals for each receive beam of the set of receive beams based on the received set of reference signals, where transmitting the RACH signal includes transmitting the set of RACH signals using the set of transmit beams based on the determined transmit power level of each RACH signal of the set of RACH signals.

In some examples of the method, apparatuses, and non-transitory computer-readable medium described herein, determining the level of self-interference may include operations, features, means, or instructions for determining the level of self-interference of the received beam based on the transmitted set of RACH signals using the set of receive beams, where operating in the mode includes operating in the mode based on the determined level of self-interference based on the transmitted set of RACH signals using the set of receive beams.

Some examples of the method, apparatuses, and non-transitory computer-readable medium described herein may further include operations, features, means, or instructions for receiving a message including an indication of a set of preamble resources, the set of preamble resources including a set of common preamble resources for determining the level of self-interference at the device and at least one other device, where determining the level of self-interference includes determining the level of self-interference of the received beam based on the set of common preamble resources.

Some examples of the method, apparatuses, and non-transitory computer-readable medium described herein may further include operations, features, means, or instructions for determining an additional RACH configuration, and performing at least one RACH operation different from determining the level of self-interference based on the additional RACH configuration, where the at least one RACH operation includes an initial access operation, a system information request operation, or a beam management operation.

Some examples of the method, apparatuses, and non-transitory computer-readable medium described herein may further include operations, features, means, or instructions for receiving from a network device a system information block (SIB) message including a RACH configuration, where determining the level of self-interference includes determining the level of self-interference of the received beam based on the received SIB message including the RACH configuration.

Some examples of the method, apparatuses, and non-transitory computer-readable medium described herein may further include operations, features, means, or instructions for determining a set of RACH occasions or a set of RACH periods, or both, based on a RACH configuration, where determining the level of self-interference includes determining the level of self-interference of the received beam based on the set of RACH occasions or the set of RACH periods, or both.

Some examples of the method, apparatuses, and non-transitory computer-readable medium described herein may further include operations, features, means, or instructions for allocating a set of preamble identifiers or a set of preamble resources, or both, and transmitting a message including an indication of the set of preamble identifiers or the set of preamble resources, or both.

Some examples of the method, apparatuses, and non-transitory computer-readable medium described herein may further include operations, features, means, or instructions for transmitting a report including an indication of the determined level of self-interference of the received beam, where operating in the mode includes operating in the mode based on the transmitted report including the indication of the determined level of self-interference of the received beam.

In some examples of the method, apparatuses, and non-transitory computer-readable medium described herein, transmitting the report may include operations, features, means, or instructions for transmitting the report in a RACH payload associated with the RACH signal.

In some examples of the method, apparatuses, and non-transitory computer-readable medium described herein, the wireless communication includes full duplex communication.

A method of wireless communication at a network device is described. The method may include determining a RACH configuration for a device to transmit a RACH signal using a transmit beam of a set of transmit beams and determine a level of self-interference of a receive beam of a set of receive beams associated with the device and transmitting a message including the RACH configuration.

An apparatus for wireless communication is described. The apparatus may include a processor, memory coupled with the processor, and instructions stored in the memory. The instructions may be executable by the processor to cause the apparatus to determine a RACH configuration for a device to transmit a RACH signal using a transmit beam of a set of transmit beams and determine a level of self-interference of a receive beam of a set of receive beams associated with the device and transmit a message including the RACH configuration.

Another apparatus for wireless communication is described. The apparatus may include means for determining a RACH configuration for a device to transmit a RACH signal using a transmit beam of a set of transmit beams and determine a level of self-interference of a receive beam of a set of receive beams associated with the device and transmitting a message including the RACH configuration.

A non-transitory computer-readable medium storing code for wireless communication at a network device is described. The code may include instructions executable by a processor to determine a RACH configuration for a device to transmit a RACH signal using a transmit beam of a set of transmit beams and determine a level of self-interference of a receive beam of a set of receive beams associated with the device and transmit a message including the RACH configuration.

Some examples of the method, apparatuses, and non-transitory computer-readable medium described herein may further include operations, features, means, or instructions for receiving a report including an indication of the determined level of self-interference of the receive beam of the set of receive beams associated with the device, and operating in a mode based on the received report including the indication of the determined level of self-interference of the receive beam of the set of receive beams associated with the device.

In some examples of the method, apparatuses, and non-transitory computer-readable medium described herein, receiving the report may include operations, features, means, or instructions for receiving the report in a RACH payload associated with the RACH signal.

Some examples of the method, apparatuses, and non-transitory computer-readable medium described herein may further include operations, features, means, or instructions for receiving the RACH signal from the device using a receive beam of a set of receive beams, and operating in a mode based on the received RACH signal from the device.

Some examples of the method, apparatuses, and non-transitory computer-readable medium described herein may further include operations, features, means, or instructions for determining a timing advance associated with the RACH configuration based on one or more timing advances associated with one or more uplink transmissions, where receiving the RACH signal includes receiving the RACH signal using the receive beam of the set of transmit beams based on the timing advance.

Some examples of the method, apparatuses, and non-transitory computer-readable medium described herein may further include operations, features, means, or instructions for allocating a set of preamble identifiers or a set of preamble resources, or both, where transmitting the message includes transmitting the message including an indication of the set of preamble identifiers or the set of preamble resources, or both.

DETAILED DESCRIPTION

Figure 1:
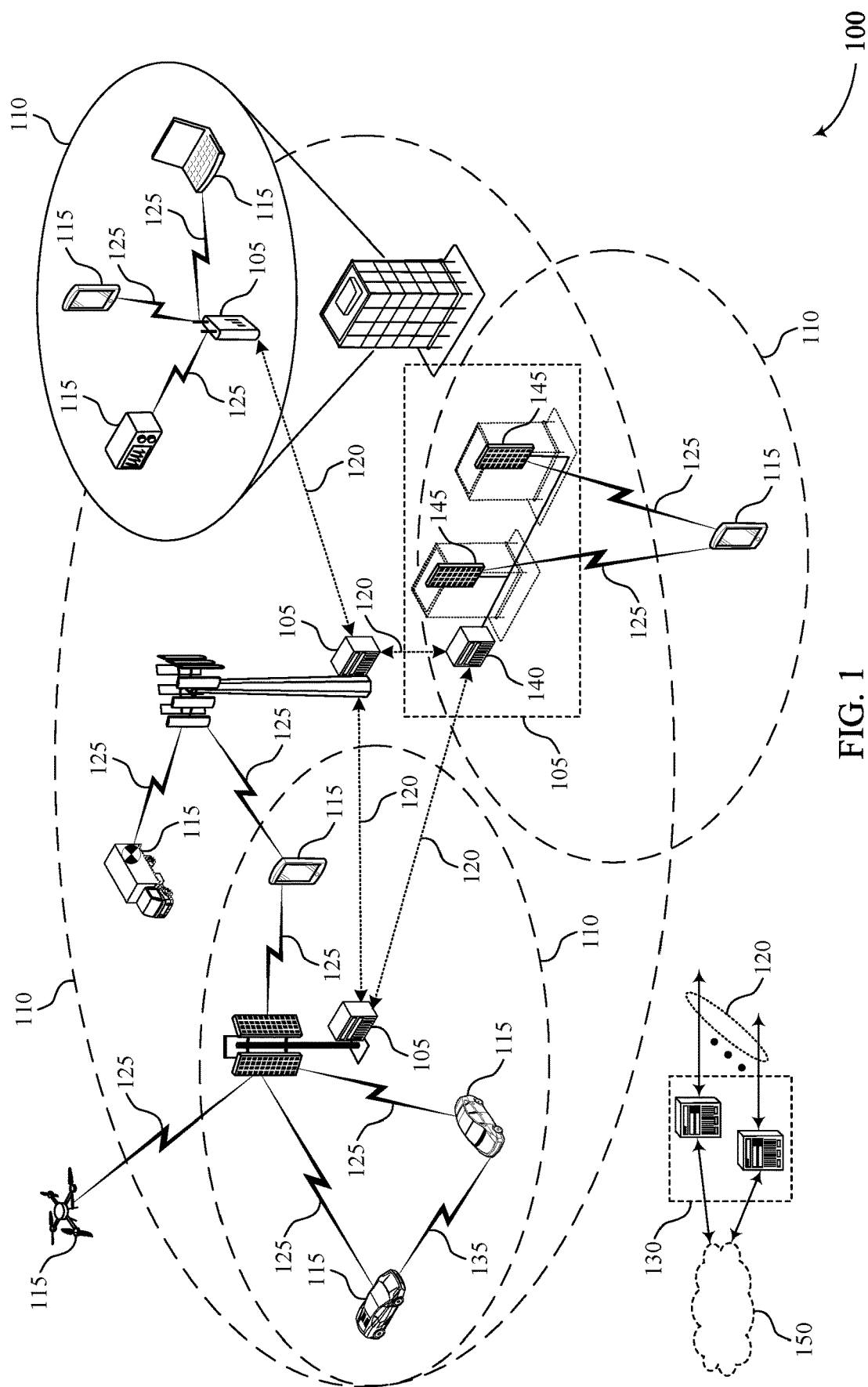
FIGS. 1 and 2 illustrate example of a wireless communications systems that support techniques for random access channel (RACH) based self-interference measurement in accordance with various aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may support duplex communications, such as half-duplex communications and full-duplex communications, in 4G and 5G systems. In some cases, the communication devices may experience interference issues due to the half-duplex communications and full-duplex communications, which may affect reliability and latency for the duplex communications. As demand for communication efficiency increases, it may be desirable for the communication devices to provide improvements to duplex communications to support higher reliability and lower latency duplex operations, among other examples.

The communication devices may experience a level of self-interference due to signal leakage between a transmitting antenna and a receiving antenna. For example, the communication devices utilizing full-duplex communications (e.g., simultaneously transmitting over an uplink channel and receiving wireless communications over a downlink channel) may experience a level of self-interference on receiving antennas due to uplink wireless communications by the communication devices. It may be therefore desirable to reduce or eliminate the impact of self-interference at the communication devices. In some cases, the communication devices may use reference signals (e.g., uplink reference signals, downlink reference signals) for measuring self-interference. However, self-interference measurement using reference signals may include the transmission of reference signals involve a timing advance, which may be inefficient, thereby increasing latency for self-interference measurement.

Various aspects of the present disclosure relate to configuring the communication devices to decrease or eliminate the self-interference experienced at the communication devices by measuring a level of self-interference using one or more random access channel (RACH) signals. In some examples, the communication devices may be configured to measure a level of self-interference using a RACH preamble or a RACH payload, or both. The example techniques described herein for utilizing RACH signals may provide benefits over techniques which use other signals (e.g., downlink reference signals, uplink reference signals) for measuring the self-interference at the communication devices. In some examples, utilizing the RACH signals may accommodate for large time misalignment. For example, a RACH preamble may have a guard period (GP) that protects against resource leakage, which may improve reliability for self-interference measurement. In some examples, the communication devices may transmit RACH signals without a timing advance, thereby reducing latency for self-interference measurement.

The communication devices may, as described herein, support techniques for RACH-based self-interference measurement, which may account for self-interference between uplink communication and downlink communication when operating in a full-duplex mode. The communication devices may transmit a RACH signal using a transmit beam of a set of transmit beams. The RACH signal may include, for example, a RACH preamble. The communication devices may determine (e.g., measure) a level of self-interference, based on the transmitted RACH signal. For example, the communication devices may receive, based on the transmitted RACH signal, a receive beam of a set of receive beams. The communication devices may determine a level of self-interference of the received beam.

Aspects of the subject matter described in this disclosure may be implemented to realize one or more of the following potential improvements, among others. The techniques employed by the communication devices may provide benefits and enhancements to the operation of the communication devices. For example, operations performed by the communication devices may provide improvements to duplex communications. In some examples, configuring the communication devices to support techniques for RACH-based self-interference measurement may support improvements to power consumption, spectral efficiency, and, in some examples, may promote enhanced efficiency and reduced latency for duplex communications operations, among other benefits.

Aspects of the disclosure are initially described in the context of wireless communications systems. Aspects of the disclosure are further illustrated by and described with reference to apparatus diagrams, system diagrams, and flowcharts that relate to techniques for RACH-based self-interference measurement.

FIG. 1 illustrates an example of a wireless communications system 100 that supports techniques for RACH-based self-interference measurement in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum band resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a bandwidth of the radio frequency spectrum band, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum band resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell, for example, covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may be configured with multiple antenna panels, where one antenna panel may be dedicated for downlink communications and another antenna panel may be dedicated for simultaneous uplink communication (e.g., communicating simultaneously on the uplink and downlink during a time period). Simultaneous downlink and uplink communications may result in self-interference at a base station 105, at a UE 115, or both. In some cases, self-interference such as clutter interference (e.g., associated with signal echoes in the wireless communications systems 100) may reduce the reliability and increase latency for mmW communications between the UEs 115 and base stations 105 utilizing duplex operations (e.g., full-duplex operations). In some cases of clutter interference, detecting and estimating clutter echo may include using an increased transmission power (e.g., compared to near-field coupling). Clutter echo may include a large round trip time, and in some cases, clutter echo may be in directions different from active beams, candidate beams, or both.

In some cases, techniques for mitigating clutter interference for mmW communications may include high isolation (e.g., >85 dB) at transmitter-receiver arrays of a device (e.g., a UE 115, a base station 105). In some other cases, digital and analog cancellation techniques for self-interference measurement may be applied at the UEs 115 and the base stations 105. Accordingly, as some techniques may mitigate leakage between antenna panels (e.g., an antenna panel associated with transmit beams and an antenna panel associated with receive beams) of the device, improvements to duplex communications may be desired for mitigating clutter echo from objects surrounding the device. In some examples, the UEs 115 and the base stations 105 may support null forming procedures for mitigating clutter interference. For example, the UEs 115 and the base stations 105 may adjust any combination of transmit beams and receive beams, which may form nulls in the direction in the direction of clutter echo. Some example techniques for self-interference measurement between uplink communication and downlink communication at a device (e.g., the UE 115 or the base station 105) operating in a full-duplex mode may include measurement of a signal transmitted by the device (e.g., a RACH signal transmitted by the UE 115, such as a RACH preamble or a RACH payload, or both).

A UE 115 may, as described herein, support techniques for RACH-based self-interference measurement, for example, of self-interference between uplink communication and downlink communication at the UE 115 and a base station 105 operating in a full-duplex mode. The UE 115 may transmit a RACH signal using a transmit beam of a set of transmit beams. In an example, the UE 115 may transmit a RACH signal. The RACH signal may include, for example, a RACH preamble. In some examples, the UE 115 may determine (e.g., measure) a level of self-interference at the UE 115, based on the transmitted RACH signal. For example, the UE 115 may receive, based on the transmitted RACH signal, a receive beam of a set of receive beams. The UE 115 may determine a level of self-interference of the received beam. The UE 115 may operate in a mode (e.g., half-duplex, full-duplex) based on the determined level of self-interference. The UE 115 may transmit a report including an indication of the measured level of self-interference at the UE 115. In some examples, the UE 115 may determine (e.g., measure) the level of self-interference of the received beam based on a RACH configuration. In an example, the UE 115 may determine the RACH configuration based on a message from the base station 105. The message may include an indication of the RACH configuration.

A base station 105 may, as described herein, support techniques for RACH-based self-interference measurement, which may account for self-interference between uplink communication and downlink communication at a UE 115 and the base station 105 operating in a full-duplex mode. The base station 105 may determine a RACH configuration for a UE 115 to transmit a RACH signal using a transmit beam of the UE 115 and determine a level of self-interference of a receive beam of a set of receive beams associated with the UE 115. In some examples, the base station 105 may transmit a message including the RACH configuration. The base station 105 may receive a report including an indication of the determined level of self-interference of the receive beam of the set of receive beams associated with the UE 115. In some examples, the base station 105 may operate in a mode (e.g., half-duplex, full-duplex) based on the received report.

Figure 2:
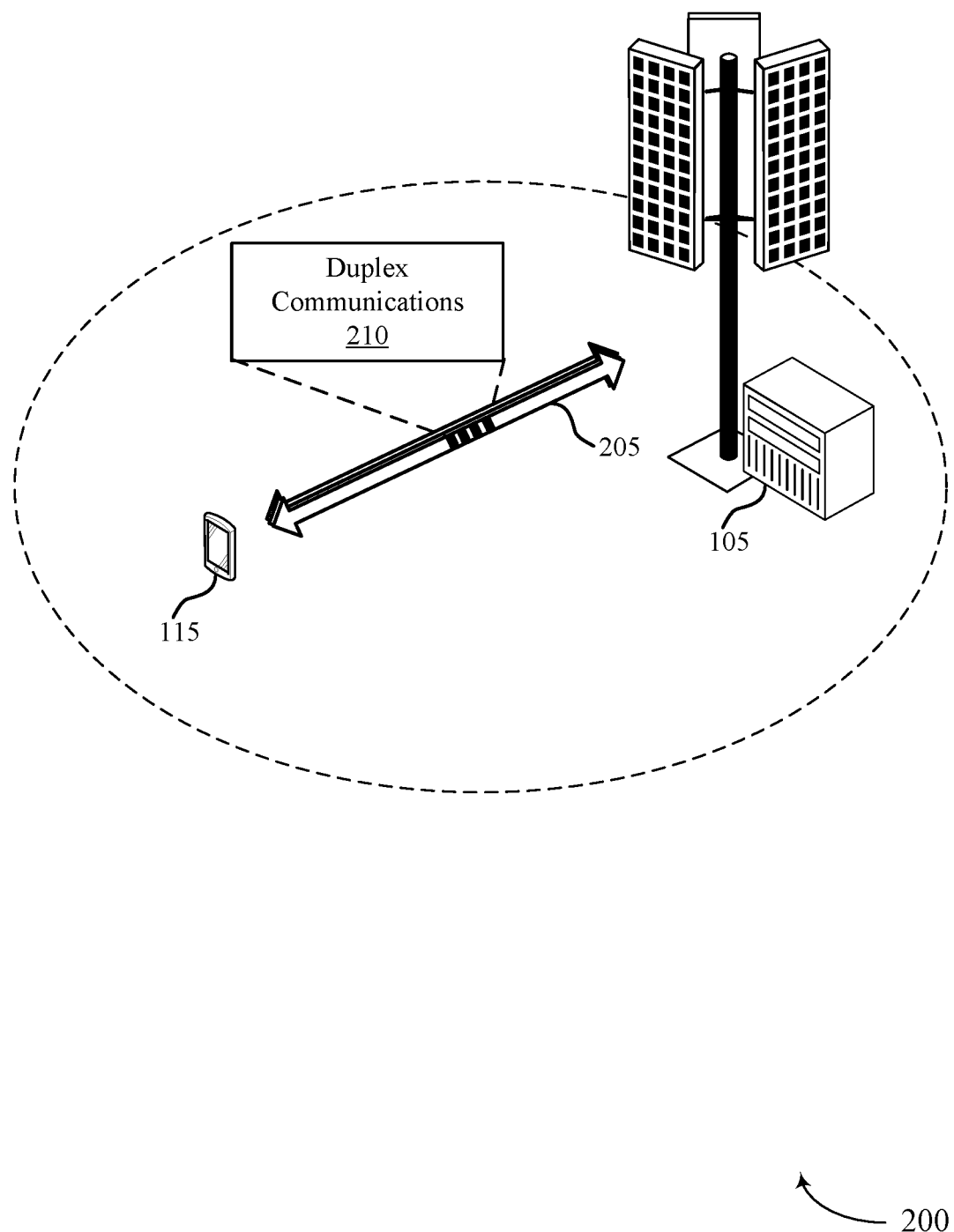

FIG. 2 illustrates an example of a wireless communications system 200 that supports techniques for RACH-based self-interference measurement in accordance with various aspects of the present disclosure. In some examples, the wireless communications system 200 may implement aspects of the wireless communications system 100. For example, the wireless communications system 200 may include a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, MIMO, or beamforming, or any combination thereof. The antennas of the base station 105 and the UE 115 may be located within one or more antenna arrays or antenna panels, which may support MIMO operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various MIMO or beamforming operations. Additionally or alternatively, an antenna panel may support radio frequency beamforming for a signal transmitted via one or more antenna ports. The base station 105 and the UE 115 may thus be configured to support directional communications 205 (e.g., beamformed communications) using the multiple antennas.

The base station 105 and the UE 115 may communicate via the directional communications 205 using multiple component carriers. For example, the base station 105 and the UE 115 may be configured to support multiple downlink component carriers and multiple uplink component carriers. The base station 105 and the UE 115 may be configured to support the directional communications 205 over a carrier bandwidth or may be configured to support the directional communications 205 over one of multiple carrier bandwidths. In some examples, the base station 105 or the UE 115 may support duplex communications 210, such as half-duplex communications or full-duplex communications, or both, via carriers associated with multiple carrier bandwidths over the directional communications 205.

The base station 105 and the UE 115 may, in some cases, support subband half-duplex communications or subband full-duplex communications. The base station 105 and the UE 115 may support duplex communications using TDD techniques or FDD techniques. The base station 105 and the UE 115 may, in some cases, support TDD operations and FDD operations in an unpaired spectrum or a paired spectrum. An unpaired spectrum provides a single subband or a single band for both downlink communications and uplink communications. A paired spectrum provides a distinct subband or band for downlink communications and uplink communications. For example, the wireless communications system 200 may have a block of radio frequency spectrum in a lower radio frequency spectrum band and an associated block of radio frequency spectrum in an upper radio frequency spectrum band. This arrangement of radio frequency spectrum bands with one band for the uplink communications and one band for the downlink communications is referred to as paired spectrum. In some cases, when the base station 105 and the UE 115 are configured with multiple antenna panels, where one antenna panel may be dedicated for downlink communications and another antenna panel may be dedicated for uplink communications in an unpaired spectrum or a paired spectrum, the base station 105 and the UE 115 may experience self-interference. The self-interference may be a result of simultaneously using multiple antenna panels for uplink communications and downlink communications (e.g., in full-duplex communications).

The UE 115 and the base station 105 may support techniques for RACH-based self-interference measurement, which may account for self-interference between uplink communication and downlink communication at the UE 115 and the base station 105 operating in a full-duplex mode. In some examples, self-interference measurement at the UE 115 may include use of a RACH preamble. In some other examples, self-interference measurement at the UE 115 may include use of a RACH configuration. In some cases, the UE 115 may transmit a RACH signal to the base station 105 to obtain uplink synchronization with the base station 105. In an example, the UE 115 may transmit a RACH preamble to the base station 105 to obtain the uplink synchronization. The UE 115 may select between different formats for the RACH preamble. For example, the UE 115 may select between a long preamble format (e.g., Format 0, Format 1, Format 2, or Format 3) or a short preamble format (e.g., Format A1, Format A2, Format A3, Format B1, Format B2, Format B3, Format B4, Format C0, Format C1) for the RACH preamble. In some examples, the UE 115 may select a spacing (e.g., a gap length or a GP) from a synchronization signal block (SSB) symbol for the RACH preamble. Accordingly, the UE 115 may select a RACH preamble to accommodate for time misalignment (e.g., the GP of the RACH preamble may protect against leakage to the next symbol in cases of a large time offset).

In some cases, the GP may protect against leakage (e.g., between a transmit beam and a receive beam) in cases in which clutter echo is present and cell and network-specific parameters (e.g., system information (SI)) include a large round trip time (e.g., a large amount of time between retransmissions in a HARQ protocol). In some examples, the UE 115 may transmit a RACH preamble without a timing advance (e.g., uplink transmission timing of the RACH preamble may be aligned with downlink receiving timing). Accordingly, the UE 115 may transmit a self-interference measurement signal without a timing advance. For example, the self-interference measurement signal may be aligned with downlink reference timing. In some cases of a RACH configuration, the wireless communications system 200 may support power ramping for retransmissions of a RACH preamble (e.g., for clutter echo detection). In some examples, the wireless communications system 200 (e.g., the base station 105) may configure RACH occasions to be associated with SSBs. In an example, the UE 115 may utilize the associations in self-interference measurement.

To mitigate the self-interference at the UE 115, the UE 115 (or any other UE of the wireless communications system 200) may transmit one or multiple RACH preambles using one or multiple transmission beams. The UE 115 may simultaneously measure self-interference (e.g., based on the transmitted RACH preambles) using one or multiple receive beams. As such, the UE 115 may operate in a mode (e.g., half-duplex, full-duplex) based on the measured self-interference. In some examples, the UE 115 may determine a RACH configuration for a self-interference measurement at the UE 115. In some examples, the UE 115 may autonomously determine at least part of the RACH configuration for self-interference measurement. In an example, the RACH configuration for self-interference measurement may be network-configured. For example, the UE 115 may receive at least part of the RACH configuration for self-interference measurement from a network node (e.g., a parent node, a control node, a control unit) of the wireless communications system 200. The network node may include, for example, the base station 105 or another UE of the wireless communications system 200.

The UE 115 may determine a timing advance associated with the RACH signal. In some examples, the UE 115 may determine the timing advance based on a timing advance associated with an uplink transmission at the UE 115. In an example, the UE 115 may transmit the RACH signal based on the determined timing advance. In some examples, the UE 115 may transmit the RACH signal without applying a timing advance (e.g., timing advance equal to zero). In some examples, the UE 115 may transmit the RACH signal while applying a timing advance equal to timing advances associated with the uplink transmission at the UE 115. In some other aspects, the UE 115 may transmit the RACH signal while applying a timing advance different from the timing advances associated with the uplink transmission at the UE 115.

The UE 115 may perform clutter echo detection associated with transmit beams or receive beams of the UE 115, for example, based on the self-interference measurements at the UE 115. In some examples, the UE 115 may operate in a mode (e.g., half-duplex communication, full-duplex communication) based on the clutter echo detection. In some examples, the UE 115 may measure self-interference for configured transmit beams and receive beams to be used (or being used) by the UE 115 for full-duplex communication. In some other examples, the UE 115 may measure self-interference for configured transmit beams and receive beams to be used (or being used) for null-forming.

The UE 115 may select a preamble format for the RACH signal (e.g., the RACH preamble) based on a time offset to be accommodated with respect to a clutter echo. For example, the UE 115 may select a preamble format to accommodate a time offset associated with a largest round trip time among clutter echoes detected by the UE 115. In some examples, the UE 115 may utilize a short preamble format (e.g., Format A1, Format A2, Format A3, Format B1, Format B2, Format B3, Format B4, Format C0, Format C1) for self-interference measurement. In an example, the UE 115 may utilize a short preamble format in combination with a GP (e.g., a relatively large GP) to accommodate for any timing misalignments associated with using the short preamble format.

The wireless communications system 200 (e.g., the base station 105) may configure a pool of RACH preamble identifiers. In some other aspects, the wireless communications system 200 may configure a pool of resources for use by the UE 115 to transmit a RACH signal (e.g., a RACH preamble for self-interference measurement), which may provide for contention-free access to the base station 105. In an example, the wireless communications system 200 may assign one or more of the preamble identifiers for use by the UE 115 to transmit a RACH preamble (e.g., for self-interference measurement). In some other examples, the wireless communications system 200 may assign (e.g., on a random basis or based on criteria) a set of resources to the UE 115 from the pool of resources (e.g., for contention-free access to the base station 105). The wireless communications system 200 may exclusively assign a preamble identifier or a set of resources to the UE 115, which may mitigate potential collision (e.g., of transmissions) with other devices. In some other aspects, the UE 115 may select (e.g., on a random basis or based on criteria) a set of resources from the pool of resources (e.g., for contention-free access to the base station 105). In some other aspects, the UE 115 may select (e.g., on a random basis or based on criteria) a RACH preamble identifier from the pool of RACH preamble identifiers.

In some examples, the wireless communications system 200 may configure and indicate the transmission power of a RACH configuration for a self-interference measurement. In an example, the wireless communications system 200 may indicate the transmission power in a self-interference measurement configuration (e.g., a RACH configuration for a self-interference measurement). In some examples, the wireless communications system 200 may configure a set of RACH resources (e.g., jointly, iteratively, or across RACH periods for self-interference measurement). In some examples, the wireless communications system 200 may configure steps or levels for power ramping. For example, the wireless communications system 200 may configure an initial transmission power level, a power increase per transmission iteration (e.g., per transmission or retransmission), and the number of transmissions or retransmissions for power ramping. In an example, the UE 115 may ramp a transmit power level of a RACH signal (e.g., a RACH preamble) over one or more RACH periods.

Resources configured for random access and self-interference measurement may be associated with the transmission of other reference signals. For example, the wireless communications system 200 may identify resources associated with random access and self-interference measurement and synchronization blocks (e.g., SSBs) and configure (or reconfigure) the resources for random access and self-interference measurement. In some examples, a transmit beam for a RACH signal on a given resource may be associated (e.g., spatially quasi co-located) with a receive beam for receiving an associated reference signal (e.g., an SSB). For example, the UE 115 may select a transmit beam and a receive beam based on a quasi-co location relationship between the transmit beam and the receive beam. In some examples, the UE 115 may select a receive beam which is independently configured (e.g., no expected or fixed quasi co-location relationship with the associated reference signal). In an example, the UE 115 may transmit a self-interference measurement for random channel access (also referred to as a SIM-RACH) with an associated beam.

In some examples, the UE 115 may set the transmission power for a self-interference measurement-RACH signal (also referred to as a SIM-RACH signal) based on a reference signal. For example, the UE 115 may set the transmission power using the associated reference signal (e.g., SSB) as a reference signal for pathloss estimation. In some examples, the wireless communications system 200 may include a one-to-many mapping between reference signals and self-interference measurement-RACH signals. In some examples, the wireless communications system 200 may support transmission (e.g., by the UE 115) of self-interference measurement-RACH signals using multiple transmit beams. In some examples, the wireless communications system 200 may support measurement (e.g., by the UE 115) of self-interference measurement-RACH signals using multiple receive beams. In some examples, self-interference measurement based on RACH signals may omit random access response (RAR) or other RACH messages.

The wireless communications system 200 may support a system-wide RACH configuration for self-interference measurement. In an example, the wireless communications system 200 may configure a set of common resources for self-interference measurement-RACH. In some examples, the wireless communications system 200 may indicate the self-interference measurement-RACH configuration in a system information block (SIB) message. In some examples, multiple wireless devices (e.g., UEs 115) may utilize the common resources for self-interference measurements based on RACHs. In an example, the wireless communications system 200 may reserve the system-wide RACH configuration for self-interference measurements, for example, in addition to other RACH configurations for other purposes (e.g., initial access, SI requests).

The base station 105 may, in some examples, refrain from receiving transmitted self-interference measurement RACH signals. In some examples, the base station 105 may ignore the transmitted self-interference measurement RACH signals. In some examples, nodes other than the base station 105 (e.g., another base station of the wireless communications system 200) may use the transmitted self-interference measurement RACH signals for operations such as beam management, interference measurement, or other measurements. In some examples, the UE 115 may be configured to use a set of RACH occasions within or across RACH periods for self-interference measurements. For example, the UE 115 may be configured with a set of RACH retransmissions (e.g., the number of RACH retransmissions may be indicated by the wireless communications system 200). In some examples, the UE 115 may adopt a transmission power ramping over the configured set of RACH retransmissions.

The UE 115 may generate a report that indicates the self-interference measurements. In some examples, the UE 115 may transmit the report over a RACH payload transmission. For example, the UE 115 may transmit the report over a RACH payload transmission associated with a RACH preamble. In some examples, the UE 115 may transmit the report according to a 2-step RACH operation. The UE 115 may transmit a RACH signal using a transmit beam of a set of transmit beams. In an example, the UE 115 may transmit a RACH signal. The RACH signal may include, for example, a RACH preamble. In some examples, the UE 115 may determine (e.g., measure) a level of self-interference at the UE 115, based on the transmitted RACH signal. For example, the UE 115 may receive, based on the transmitted RACH signal, a receive beam of a set of receive beams. The UE 115 may determine a level of self-interference of the received beam. The UE 115 may operate in a mode (e.g., half-duplex, full-duplex) based on the determined level of self-interference. The UE 115 may transmit a report including an indication of the measured level of self-interference at the UE 115. In some examples, the UE 115 may determine (e.g., measure) the level of self-interference of the received beam based on a RACH configuration. In an example, the UE 115 may determine the RACH configuration based on a message from the base station 105. The message may include an indication of the RACH configuration.

The base station 105 may determine a RACH configuration for a UE 115 to transmit a RACH signal using a transmit beam of the UE 115 and determine a level of self-interference of a receive beam of a set of receive beams associated with the UE 115. In some examples, the base station 105 may transmit a message including the RACH configuration. The base station 105 may receive a report including an indication of the determined level of self-interference of the receive beam of the set of receive beams associated with the UE 115. In some examples, the base station 105 may operate in a mode (e.g., half-duplex, full-duplex) based on the received report.

The base station 105 and the UE 115 may include multiple antenna panels, where one antenna panel may be dedicated for downlink communications and another antenna panel may be dedicated for uplink communication. For example, the base station 105 and the UE 115 may be full-duplex with a split panel architecture to support simultaneous transmission or reception, or both, in subband full-duplex. In some examples, the base station 105 or the UE 115 may use multiple antenna panels for downlink or uplink communications, while using a single panel (e.g., half antenna panel) for subband full-duplex downlink or uplink communications. In some cases, simultaneously using multiple antenna panels for uplink communication and downlink communication may result in self-interference, as described herein. In some cases, a selected downlink or uplink beam may not be sufficient for the subband full-duplex downlink or uplink communications due to the self-interference, for example, between downlink communications and uplink communications. The base station 105 or the UE 115 may thus select a different directional beam to reduce or avoid the self-interference.

In such cases, the base station 105 may use both antenna panels in some slots for downlink transmission. Additionally or alternatively, the base station 105 may use a half panel in a subband full-duplex slot for downlink transmission. In some examples, the usage of antenna panels may affect downlink beamforming between both slots since the number of ports is different in each slot, the power is different in each slot, or both. In some cases, the UE 115 may choose and suggest a precoder and a beam for the base station 105 to use for downlink transmissions. However, using the selected downlink beam in a subband full-duplex may lead to self-interference between downlink transmissions and uplink transmissions (e.g., from another UE or backhaul communications from another base station, etc.). That is, the base station 105 may determine that choosing a different beam instead of the beam indicated by the UE 115 may reduce or avoid the self-interference.

Figure 3A:
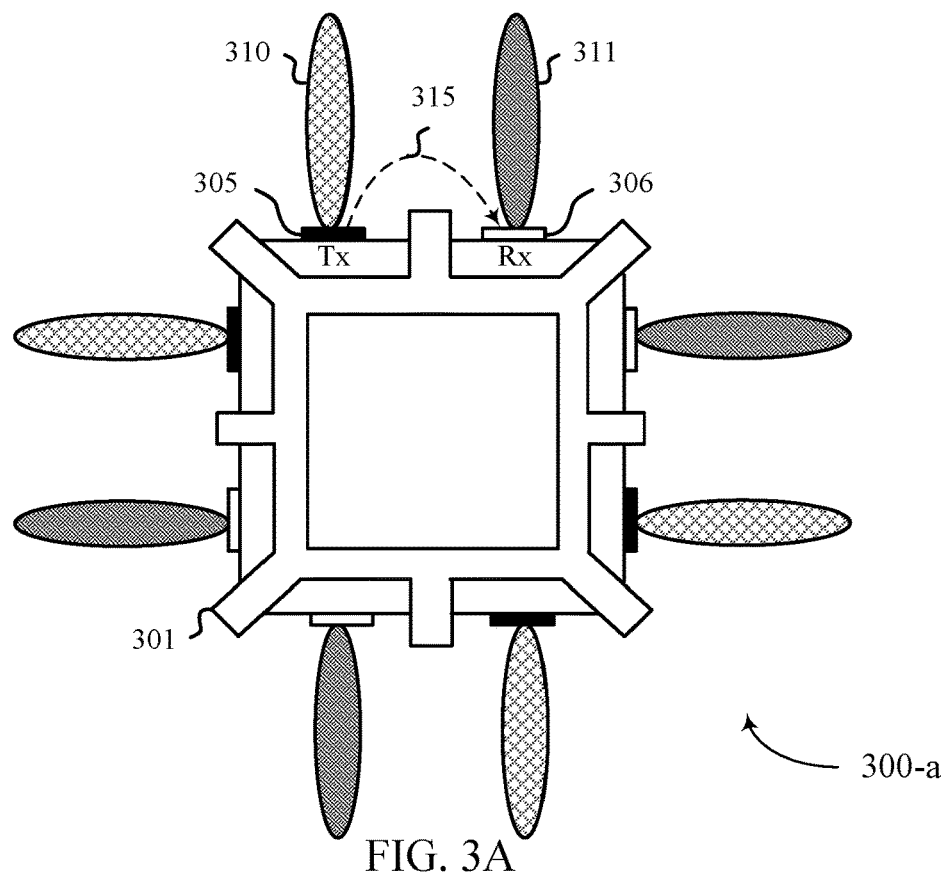
FIGS. 3A and 3B illustrate examples of wireless communications systems that support techniques for RACH-based self-interference measurement in accordance with various aspects of the present disclosure.

FIG. 3A illustrates an example of a wireless communications system 300-a that supports techniques for RACH-based self-interference measurement in accordance with various aspects of the present disclosure. The wireless communications system 300-a may, in some examples, implement aspects of the wireless communications system 100 and the wireless communications system 200. For example, the wireless communications system 300-a may support half-duplex communications or full-duplex communications. In the example of FIG. 3A, a device 301 may be configured to support full-duplex communications in the wireless communications system 300-a. The device 301 may be an example of a base station 105 or a UE 115 as described herein with reference to FIGS. 1 and 2. In some examples, the device 301 may be a backhaul node. In some examples, the device 301 may support full-duplex communications with another device (e.g., a base station 105, a UE 115).

The device 301 may be configured to operate in a half-duplex mode or a full-duplex mode. In the half-duplex mode, the device 301 may be configured to either receive downlink communications from base stations 105 (as shown in FIGS. 1 and 2), or transmit uplink communications to the base stations 105. In other words, in the half-duplex mode, the device 301 may be unable to jointly receive downlink communications and transmit uplink communications during a same time period. In the full-duplex mode, however, the device 301 may be configured to simultaneously receive downlink communications and transmit uplink communications from and to a base station 105 (as shown in FIGS. 1 and 2) during a same time period.

The device 301 may provide downlink communications using one or multiple directional beams (e.g., transmit beam 310). Likewise, the device 301 may receive multiple uplink communications using one or more multiple directional beams (e.g., receive beam 311). With reference to FIG. 3A, in the example in which the device 301 is a base station 105, the device 301 may operate in a full-duplex mode, while a UE 115 (as shown in FIGS. 1 and 2) operates in a half-duplex mode. In some cases, one or more of the device 301 and the UE 115 may experience interference in the wireless communications system 300-a. For example, the device 301 may experience self-interference from downlink communications to uplink communications (e.g., at a transmitting antenna 305 and a receiving antenna 306). In some examples, the device 301 may be configured to establish a transmitter-receiver array isolation 315 between the transmitting antenna 305 and the receiving antenna 306.

By way of example, in which the device 301 is a base station 105, the device 301 may transmit downlink communications to a UE 115 using an antenna array (e.g., including the transmitting antenna 305) of the device 301, as well as receive uplink communications from the UE 115 using an antenna array (e.g., including the receiving antenna 306) of the device 301. In some cases, the device 301 may experience self-interference due to, for example, simultaneous transmission of the downlink communications and reception of the uplink communications. Alternatively or additionally, with reference to FIG. 3A, in the example in which the device 301 is a UE 115, the device 301 may operate in a full-duplex mode, while a base station 105 (as shown in FIGS. 1 and 2) operates in a half-duplex mode. In some cases, one or more of the device 301 and the base station 105 may experience interference in the wireless communications system 300-a. For example, the device 301 may experience self-interference from downlink communications to uplink communications (e.g., at the transmitting antenna 305 and the receiving antenna 306). By way of example, the device 301 may transmit uplink communications to the base station 105 using an antenna array (e.g., including the transmitting antenna 305) of the device 301, as well as receive downlink communications from the base station 105 using an antenna array (e.g., including the receiving antenna 306) of the device 301. In some cases, the device 301 may experience self-interference, for example, simultaneous transmission of the downlink communications and reception of the uplink communications.

Figure 3B:
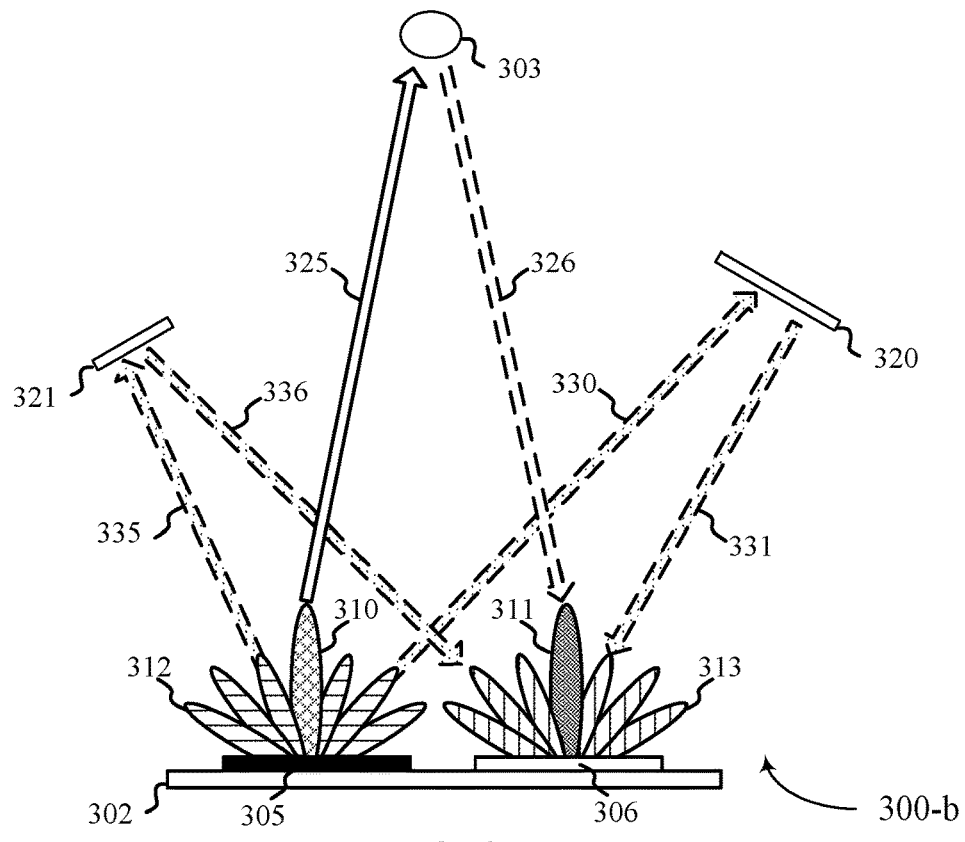

FIG. 3B illustrates an example of a wireless communications system 300-b in accordance with various aspects of the present disclosure. The wireless communications system 300-b may, in some examples, implement aspects of the wireless communications system 100, the wireless communications system 200, and the wireless communications system 300-a. The wireless communications system 300-b may support half-duplex communications or full-duplex communications. In the example of FIG. 3B, a device 302 and a device 303 may be configured to support full-duplex communications in the wireless communications system 300-b. For example, the device 302 and the device 303 may support full-duplex communications with UEs 115 (as shown in FIGS. 1 and 2) and base stations (as shown in FIGS. 1 and 2). The device 302 and the device 303 may be examples of a base station 105 (as shown in FIGS. 1 and 2), a UE 115 (as shown in FIGS. 1 and 2) and the device 301 (as shown in FIG. 3A) described herein. For example, the device 302 may include a transmitting antenna 305 (e.g., of an antenna array) and a receiving antenna 306 (e.g., of the antenna array).

The device 302 may transmit downlink communications using one or multiple directional beams (e.g., a transmit beam 310) and receive uplink communications using one or multiple directional beams (e.g., a receive beam 311). Alternatively or additionally, in an example where the device 302 is a UE 115, the device 302 may transmit uplink communications using one or multiple directional beams (e.g., a transmit beam 310) and receive downlink communications using one or multiple directional beams (e.g., a receive beam 311). In the example of FIG. 3B, the device 302 may experience some self-interference that may relate to downlink communications and uplink communications between the device 302 and the device 303. In some examples, the device 302 may experience self-interference that may relate to communication signal 325 and communication signal 326 between the device 302 and the device 303. In some cases, the device 302 may experience some self-interference that may relate to clutter echo from objects (e.g., object 320 and object 321) surrounding the device 302. The object 320 and the object 321 may be devices, for example, a base station 105 (as shown in FIGS. 1 and 2), a UE 115 (as shown in FIGS. 1 and 2), or a device 301 (as shown in FIG. 3A). In some examples, the object 320 and the object 321 may be non-device objects (e.g., physical objects within a physical environment associated with the wireless communications system 300-b).

In some cases, interference may result at the device 302 from receiving antennas and transmitting antennas of the device 302. For example, at the receiving antenna 306 of the device 302, side lobes 313 may pick up interfering signals (e.g., signal 331) from the object 320 and interfering signals (e.g., signal 336) from the object 321, which may increase noise levels in the receiver of the device 302. The signal 331 and the signal 336 may be, for example, clutter echo associated with the object 320 and the object 321, respectively. In some examples, at the transmitting antenna 305 of the device 302, side lobe radiation (e.g., signal 330, signal 335) may radiate to the object 320 and the object 321, which may cause interference at the object 320, the object 321, the device 302, and the device 303. In some examples, the device 302 may support null forming procedures for mitigating clutter interference. For example, the device 302 may adjust any combination of transmit beams and receive beams, which may form nulls in the direction of the clutter echo (e.g., in the direction of the signal 331 and the signal 336).

Figure 4:
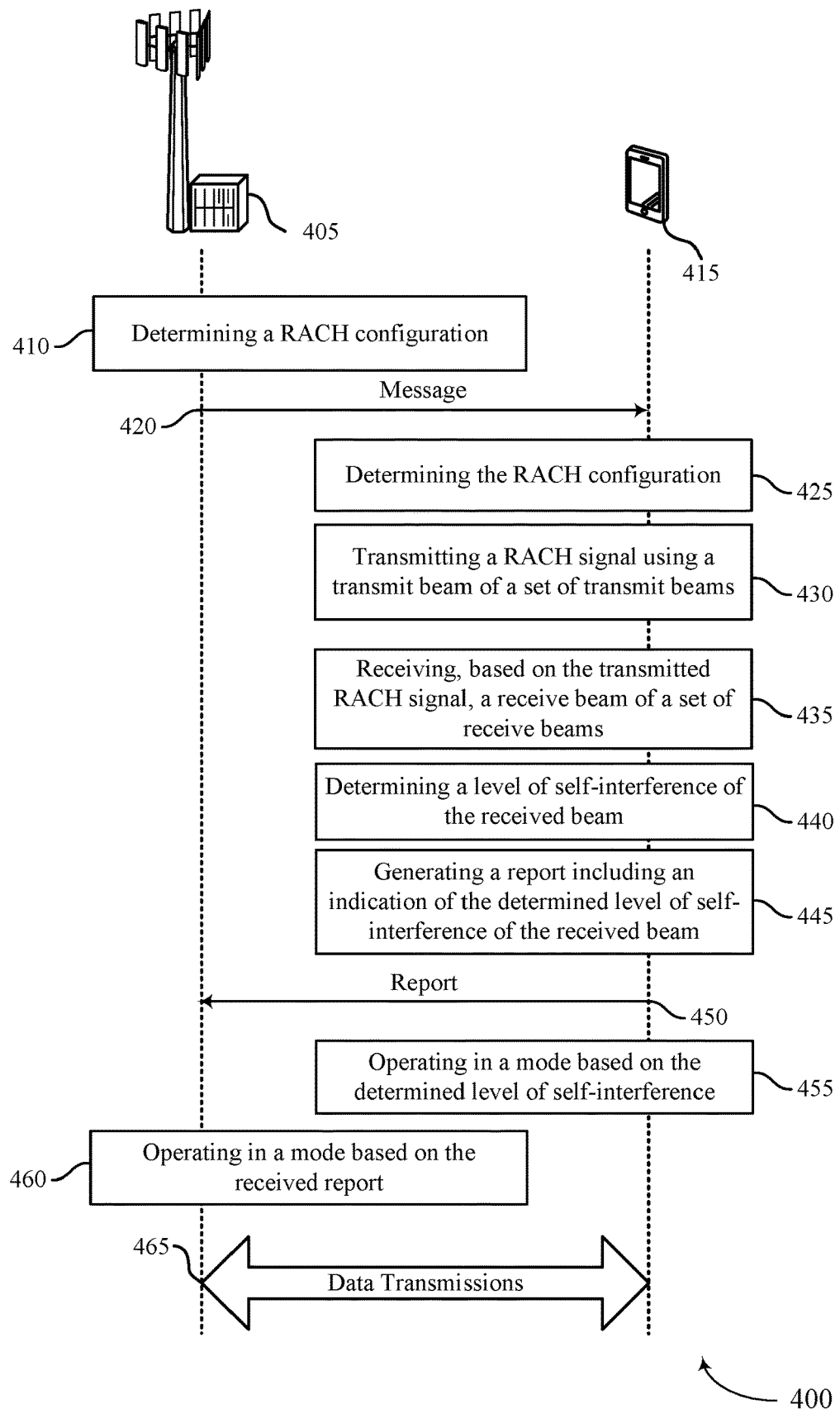
FIG. 4 illustrates an example of a process flow that supports techniques for RACH-based self-interference measurement in accordance with various aspects of the present disclosure.

FIG. 4 illustrates an example of a process flow 400 that supports techniques for RACH-based self-interference measurement in accordance with various aspects of the present disclosure. The process flow 400 may implement aspects of the wireless communications system 100, the wireless communications system 200, the wireless communications system 300-a, and the wireless communications system 300-b described with reference to FIG. 1, FIG. 2, FIG. 3, and FIG. 4, respectively. The process flow 400 may be based on a configuration by a network device (e.g., a base station 405) or a communication device (e.g., a UE 415). For example, the process flow 400 may be based on a configuration by the base station 405 or the UE 415, and implemented by the UE 415, for reduced power consumption, decreased or eliminated interference, and may promote higher reliability and lower latency for full-duplex communications, among other benefits.

The process flow 400 may include the base station 405 and the UE 415 may be examples of a base station 105 and a UE 115, as described with reference to FIGS. 1 and 2. In the following description of the process flow 400, the operations between the base station 405 and the UE 415 may be transmitted in a different order than the example order shown, or the operations performed by the base station 405 and the UE 415 may be performed in different orders or at different times. Some operations may also be omitted from the process flow 400, and other operations may be added to the process flow 400.

At 410, the base station 405 may determine a RACH configuration for the UE 415 to transmit a RACH signal using a transmit beam of a set of transmit beams and determine a level of self-interference of a receive beam of a set of receive beams associated with the UE 415. The RACH configuration may include a set of preamble identifiers for random channel access for the UE 415, a set of preamble resources for random channel access for the UE 415, or both. In some other aspects, the RACH configuration may include a set of RACH occasions or a set of RACH periods. In an example, the base station 405 may allocate the set of preamble identifiers, the set of preamble resources, or both.

At 420, the base station 405 may transmit a message to the UE 415. The message may include the RACH configuration. The message may be, for example, a SIB message. In some examples, the message may include an indication of the set of preamble identifiers. In some examples, the message may include an indication of the set of preamble resources. The set of preamble resources may be associated with one or more reference signals (e.g., an SSB, an uplink reference signal, or a downlink reference signal). In some examples, the set of preamble resources may include a set of common preamble resources. In some other examples, the message may include an indication of a timing advance associated with a RACH signal.

At 425, the UE 415 may determine the RACH configuration (e.g., for determining the level of self-interference of the receive beam of the set of receive beams associated with the UE 415). The UE 415 may determine the RACH configuration based on the received message. In some examples, the UE 415 may determine the preamble identifiers, the preamble resources, or both, from the RACH configuration.

At 430, the UE 415 may transmit a RACH signal using a transmit beam of a set of transmit beams. The UE 415 may transmit the RACH signal to the base station 405 (or another base station). In some examples, the UE 415 may transmit the RACH signal based on a transmit power level. For example, the UE 415 may determine the transmit power level of the RACH signal based on the RACH configuration. In another example, the UE 415 may determine the transmit power level of the RACH signal based on a received reference signal (e.g., received from the base station 405 or another base station).

The UE 415 may transmit the RACH signal based on a timing advance. In an example, the UE 415 may determine the timing advance associated with the RACH signal based on the timing advance indicated in the message received at 420. In some examples, the UE 415 may determine the timing advance associated with the RACH signal based on one or more timing advances associated with one or more uplink transmissions (e.g., uplink transmissions to the base station 405 or another base station). The timing advance associated with the RACH signal may be the same as (e.g., equal to) the one or more timing advances associated with the one or more uplink transmissions. In another example, the timing advance associated with the RACH signal may be different from the one or more timing advances associated with the one or more uplink transmissions.

The UE 415 may transmit the RACH signal based on a preamble format. For example, the UE 415 may select between a long preamble format (e.g., Format 0, Format 1, Format 2, or Format 3) or a short preamble format (e.g., Format A1, Format A2, Format A3, Format B1, Format B2, Format B3, Format B4, Format C0, Format C1) for the RACH signal. In some examples, the UE 415 may select between the long preamble format and the short preamble format for the RACH signal based on a timing offset.

In some examples, the UE 415 may transmit the RACH signal using the transmit beam of the set of transmit beams based on a selected preamble identifier. For example, the UE 415 may select (e.g., randomly, or based on a criteria) the preamble identifier from the set of preamble identifiers indicated in the message received at 420. In an example, the RACH signal transmitted by the UE 415 may include a RACH preamble associated with the selected preamble identifier. In some other aspects, the UE 415 may transmit the RACH signal using the transmit beam of the set of transmit beams based on a selected preamble resource. For example, the UE 415 may select (e.g., randomly, or based on a criteria) the preamble resource from the set of preamble resources indicated in the message received at 420.

In another example, the UE 415 may select a subset of preamble resources from the set of preamble resources indicated in the message received at 420. The UE 415 may ramp a transmit power level of the RACH signal over one or more RACH periods based on the selected subset of preamble resources of the set of preamble resources. In an example, the UE 415 may transmit the RACH signal at 430 using the transmit beam of the set of transmit beams, based on ramping the transmit power level of the RACH signal over one or more RACH periods.

At 435, the UE 415 may receive, based on the transmitted RACH signal, a receive beam of a set of receive beams. At 440, the UE 415 may determine a level of self-interference of the received beam. The UE 415 may determine the level of self-interference of the received beam based on a determined quasi-co location relationship between the transmit beam and the receive beam. In an example, the UE 415 may select the transmit beam and the receive beam based on determining the quasi-co location relationship. In some examples, the UE 415 may perform a RACH operation different from the RACH operation described herein for determining the level of self-interference. For example, the UE 415 may perform a RACH operation such as an initial access operation, a system information request operation, or a beam management operation. The UE 415 may determine a RACH configuration for the different RACH operation, for example, at 425.

At 445, the UE 415 may generate a report including an indication of the determined level of self-interference of the received beam. At 450, the UE 415 may transmit the report to the base station 405 (or another base station). In some examples, the UE 415 may transmit the report to the base station 405 (or another base station) over a RACH payload transmission. For example, the UE 415 may transmit the report in a RACH payload associated with the RACH signal (e.g., the RACH preamble). The base station 405 may thereby identify uplink and downlink resource restrictions associated with communicating with the UE 415.

At 455, the UE 415 may operate in a mode (e.g., a full-duplex mode) based on the determined level of self-interference of the received beam (e.g., as determined at 440). In some examples, the UE 415 may operate in the mode based on generating (e.g., at 445) or transmitting (e.g., at 450) the report which includes the indication of the determined level of self-interference. At 460, the base station 105 may operate in a mode (e.g., a full-duplex mode) based on the received report. For example, the base station 105 may operate in the mode based on the determined level of self-interference of the received beam as indicated in the report. At 465, the UE 415 may communicate data transmissions with the base station 405 using the transmit beam and the receive beam of the UE 415.

Figure 5:
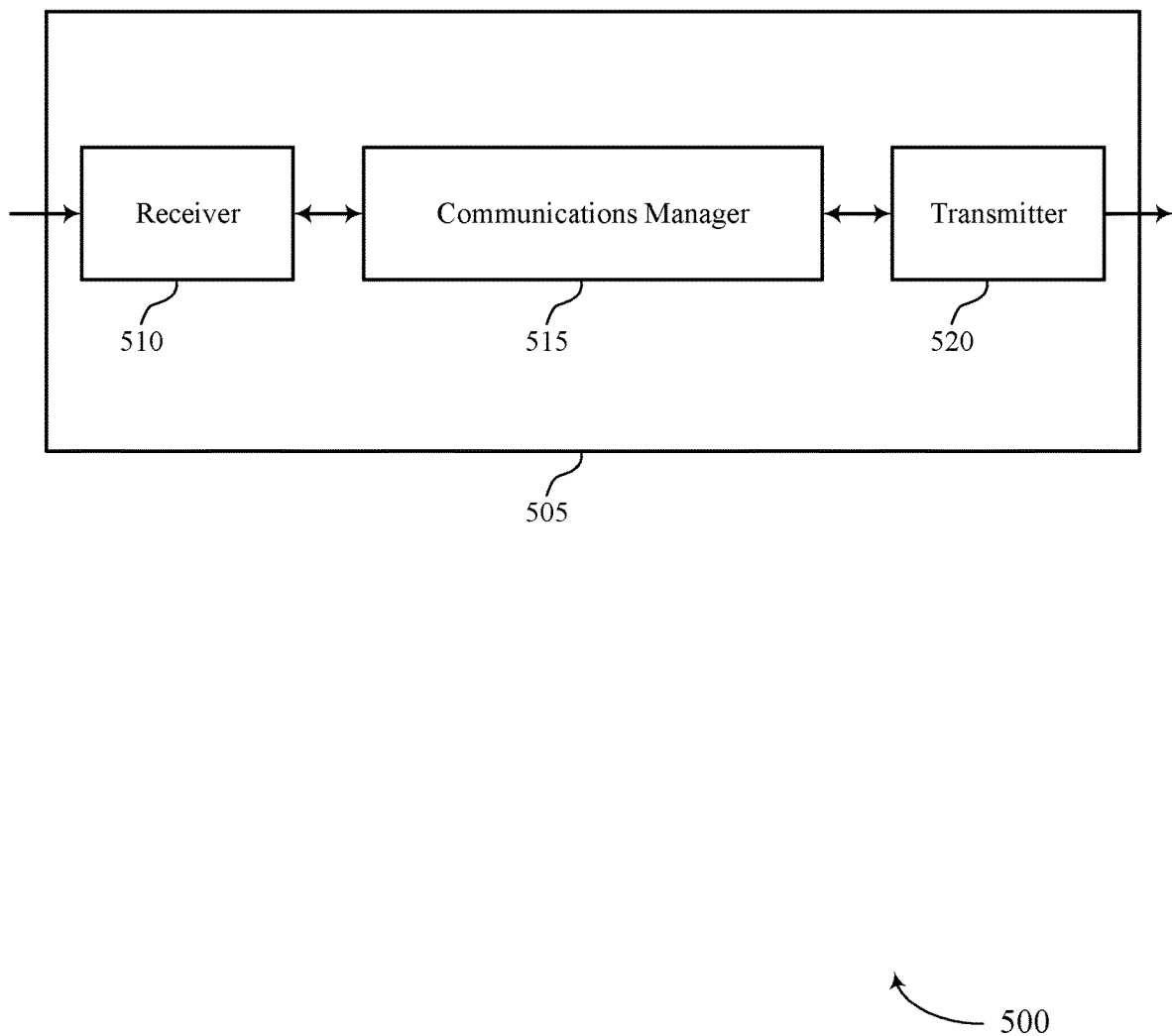
FIGS. 5 and 6 show block diagrams of devices that support techniques for RACH-based self-interference measurement in accordance with various aspects of the present disclosure.

FIG. 5 shows a block diagram 500 of a device 505 that supports techniques for RACH-based self-interference measurement in accordance with various aspects of the present disclosure. The device 505 may be an example of aspects of a device as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to RACH-based self-interference measurement, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a RACH signal using a transmit beam of a set of transmit beams. The communications manager 515 may receive, based on the transmitted RACH signal, a receive beam of a set of receive beams, and determine a level of self-interference of the received beam. The communications manager 515 may operate in a mode based on the determined level of self-interference. The communications manager 515 may be an example of aspects of the communications manager 810 described herein.

The communications manager 515 may be implemented as an integrated circuit or chipset for a mobile device modem, and the receiver 510 and the transmitter 520 may be implemented as analog components (for example, amplifiers, filters, antennas) coupled with the mobile device modem to enable wireless transmission and reception. The communications manager 515 may be implemented to realize one or more potential improvements. At least one implementation may enable the communications manager 515 to measure self-interference at the device 505 based on at least one transmitted RACH signal (e.g., a RACH preamble) using one or more receive beams of a set of receive beams. Based on implementing the self-interference measurement according to at least one transmitted RACH signal, one or more processors of the device 505 (for example, processor(s) controlling or incorporated with the communications manager 515) may promote high reliability and low latency interference measurement operations, among other benefits The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
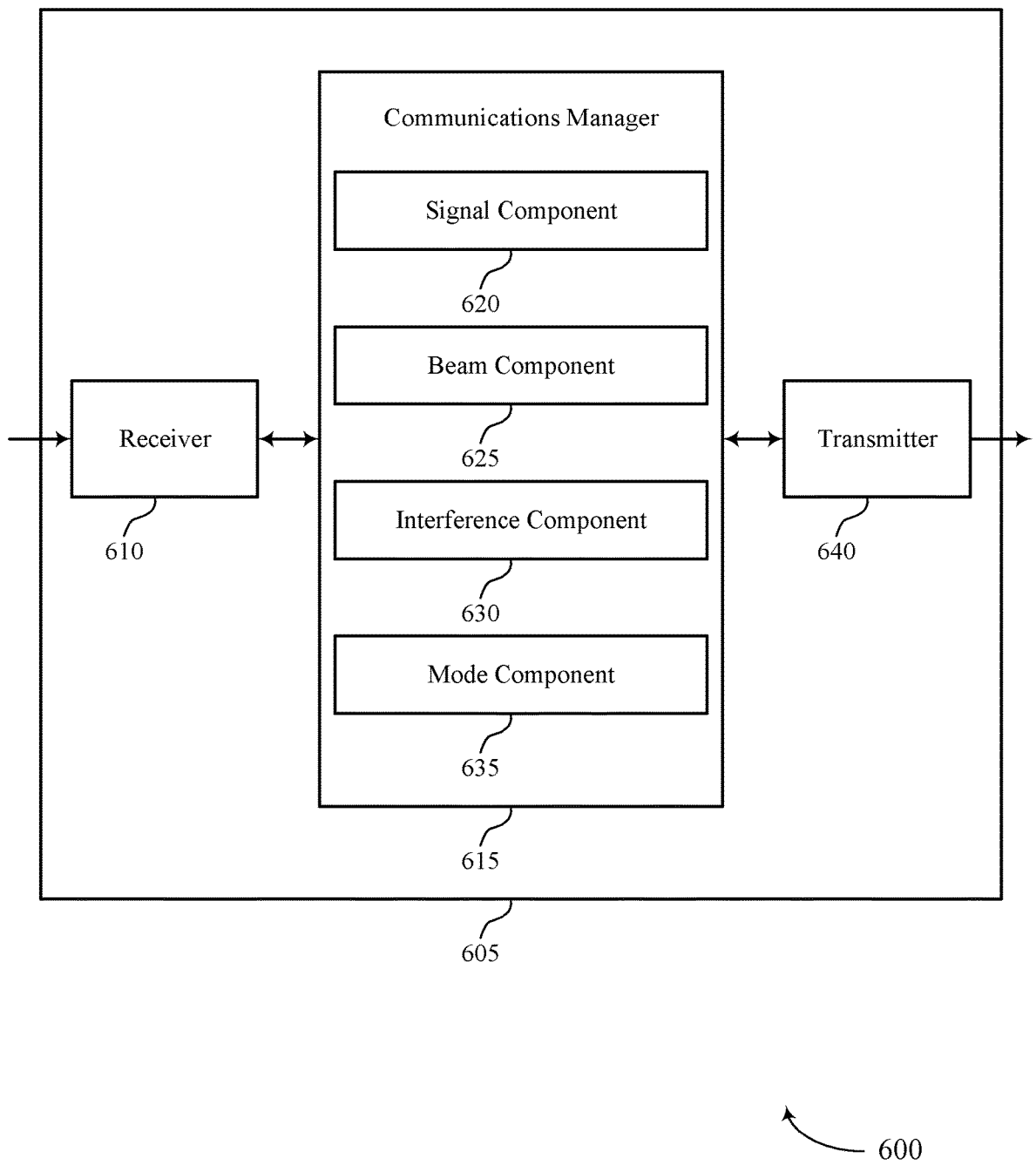

FIG. 6 shows a block diagram 600 of a device 605 that supports techniques for RACH-based self-interference measurement in accordance with various aspects of the present disclosure. The device 605 may be an example of aspects of a device 505, or a base station 105, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to RACH-based self-interference measurement, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a signal component 620, a beam component 625, an interference component 630, and a mode component 635. The communications manager 615 may be an example of aspects of the communications manager 810 described herein. The signal component 620 may transmit a RACH signal using a transmit beam of a set of transmit beams. The beam component 625 may receive, based on the transmitted RACH signal, a receive beam of a set of receive beams. The interference component 630 may determine a level of self-interference of the received beam. The mode component 635 may operate in a mode based on the determined level of self-interference.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
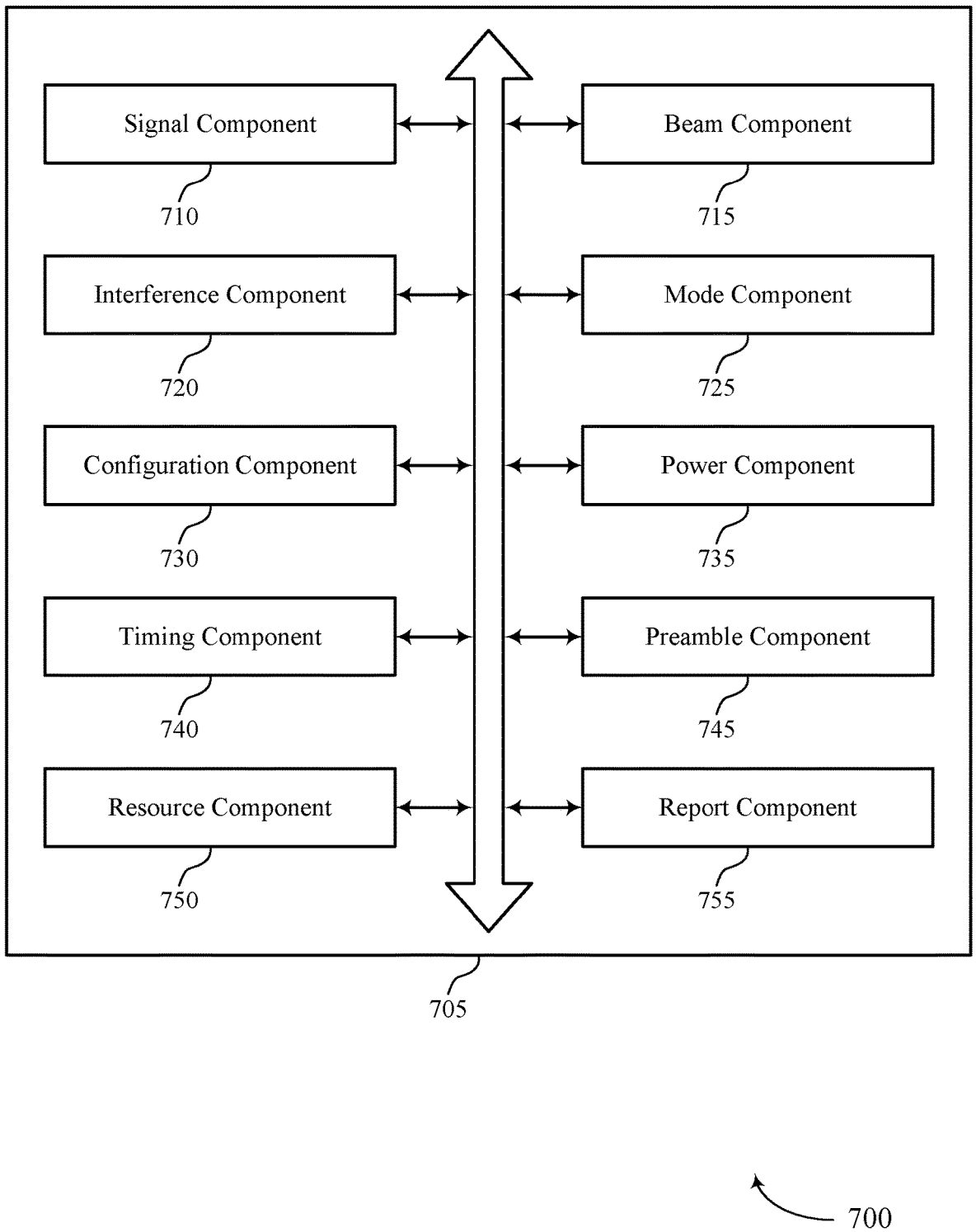
FIG. 7 shows a block diagram of a communications manager that supports techniques for RACH-based self-interference measurement in accordance with various aspects of the present disclosure.

FIG. 7 shows a block diagram 700 of a communications manager 705 that supports techniques for RACH-based self-interference measurement in accordance with various aspects of the present disclosure. The communications manager 705 may be an example of aspects of a communications manager 515, a communications manager 615, or a communications manager 810 described herein. The communications manager 705 may include a signal component 710, a beam component 715, an interference component 720, a mode component 725, a configuration component 730, a power component 735, a timing component 740, a preamble component 745, a resource component 750, and a report component 755. Each of these components may communicate, directly or indirectly, with one another (e.g., via one or more buses).

The signal component 710 may transmit a RACH signal using a transmit beam of a set of transmit beams. In some examples, the signal component 710 may receive a set of reference signals using the set of receive beams. The signal component 710 may determine a transmit power level of each RACH signal of a set of RACH signals for each receive beam of the set of receive beams based on the received set of reference signals. In some examples, the signal component 710 may transmit the set of RACH signals using the set of transmit beams based on the determined transmit power level of each RACH signal of the set of RACH signals.

The beam component 715 may receive, based on the transmitted RACH signal, a receive beam of a set of receive beams. In some examples, the beam component 715 may select the transmit beam and the receive beam based on determining a quasi-co location relationship between the transmit beam and the receive beam. The beam component 715 may transmit the RACH signal using the transmit beam of the set of transmit beams based on the determined quasi-co location relationship. In some examples, the beam component 715 may determine the level of self-interference of the received beam based on the determined quasi-co location relationship.

The beam component 715 may receive a reference signal using the receive beam of the set of receive beams. In some examples, the beam component 715 may determine a transmit power level of the RACH signal based on the received reference signal. In some examples, the beam component 715 may transmit the RACH signal using the transmit beam of the set of transmit beams based on the determined transmit power level of the RACH signal.

The interference component 720 may determine a level of self-interference of the received beam. In some examples, the interference component 720 may determine the level of self-interference of the received beam based on the transmitted set of RACH signals using the set of receive beams. The mode component 725 may operate in a mode based on the determined level of self-interference. In some examples, the mode component 725 may operate in the mode based on the determined level of self-interference based on the transmitted set of RACH signals using the set of receive beams. In some cases, the wireless communication includes full duplex communication.

The configuration component 730 may determine a RACH configuration. In some examples, the configuration component 730 may determine the level of self-interference of the received beam based on the RACH configuration. In some examples, the configuration component 730 may receive from a network device a message including the RACH configuration. In some examples, the configuration component 730 may determine the level of self-interference of the received beam based on the received message from the network device. In some examples, the configuration component 730 may determine an additional RACH configuration. In some examples, the configuration component 730 may perform at least one RACH operation different from determining the level of self-interference based on the additional RACH configuration.

The configuration component 730 may receive from a network device a SIB message including a RACH configuration. In some examples, the configuration component 730 may determine the level of self-interference of the received beam based on the received SIB message including the RACH configuration. In some cases, the at least one RACH operation includes an initial access operation, a system information request operation, or a beam management operation. The power component 735 may determine a transmit power level of the RACH signal based on the RACH configuration. In some examples, the power component 735 may transmit the RACH signal using the transmit beam of the set of transmit beams based on the determined transmit power level of the RACH signal.

The timing component 740 may determine a timing advance associated with the RACH signal based on one or more timing advances associated with one or more uplink transmissions. In some examples, the timing component 740 may transmit the RACH signal using the transmit beam of the set of transmit beams based on the timing advance. The timing component 740 may receive a message including an indication of a timing advance associated with the RACH signal. In some examples, the timing component 740 may transmit the RACH signal using the transmit beam of the set of transmit beams based on the timing advance indicated in the received message. The timing component 740 may determine a set of RACH occasions or a set of RACH periods, or both, based on a RACH configuration. In some examples, the timing component 740 may determine the level of self-interference of the received beam based on the set of RACH occasions or the set of RACH periods, or both. In some cases, the timing advance associated with the RACH signal and the one or more timing advances associated with the one or more uplink transmissions are the same. In some cases, the timing advance associated with the RACH signal is different from one or more timing advances associated with one or more uplink transmissions.

The preamble component 745 may select a preamble format associated with the RACH signal based on a timing offset. In some examples, the preamble component 745 may transmit the RACH signal using the transmit beam of the set of transmit beams based on the selected preamble format. In some examples, the preamble component 745 may receive a message including an indication of a set of preamble identifiers or a set of preamble resources, or both. The preamble component 745 may select a preamble identifier of the set of preamble identifiers or a preamble resource of the set of preamble resources, or both, based on the received message. In some examples, the preamble component 745 may transmit the RACH signal using the transmit beam of the set of transmit beams based on the selected preamble identifier or the selected preamble resource, or both, where the RACH signal includes a RACH preamble associated with the selected preamble identifier. In some examples, the preamble component 745 may randomly select the preamble identifier of the set of preamble identifiers or the preamble resource of the set of preamble resources, or both. In some examples, the preamble component 745 may select the preamble identifier of the set of preamble identifiers or the preamble resource of the set of preamble resources, or both, based on a criteria.

In some examples, the preamble component 745 may receive a message including an indication of a set of preamble resources, the set of preamble resources including a set of common preamble resources for determining the level of self-interference at the device and at least one other device. In some examples, the preamble component 745 may determine the level of self-interference of the received beam based on the set of common preamble resources. In some examples, the preamble component 745 may allocate a set of preamble identifiers or a set of preamble resources, or both. In some examples, the preamble component 745 may transmit a message including an indication of the set of preamble identifiers or the set of preamble resources, or both. In some cases, the preamble format includes a short preamble format or a long preamble format.

The resource component 750 may select a subset of preamble resources of the set of preamble resources. In some examples, the resource component 750 may ramp a transmit power level of the RACH signal over one or more RACH periods based on the selected subset of preamble resources of the set of preamble resources. In some examples, the resource component 750 may transmit the RACH signal using the transmit beam of the set of transmit beams based on ramping the transmit power level of the RACH signal over the one or more RACH periods. In some cases, the set of preamble resources are associated with one or more reference signals. In some cases, the one or more reference signals include an SSB. In some cases, the one or more reference signals include an uplink reference signal, or a downlink reference signal, or both.

The report component 755 may transmit a report including an indication of the determined level of self-interference of the received beam. In some examples, the report component 755 may operate in the mode based on the transmitted report including the indication of the determined level of self-interference of the received beam. In some examples, the report component 755 may transmit the report in a RACH payload associated with the RACH signal.

Figure 8:
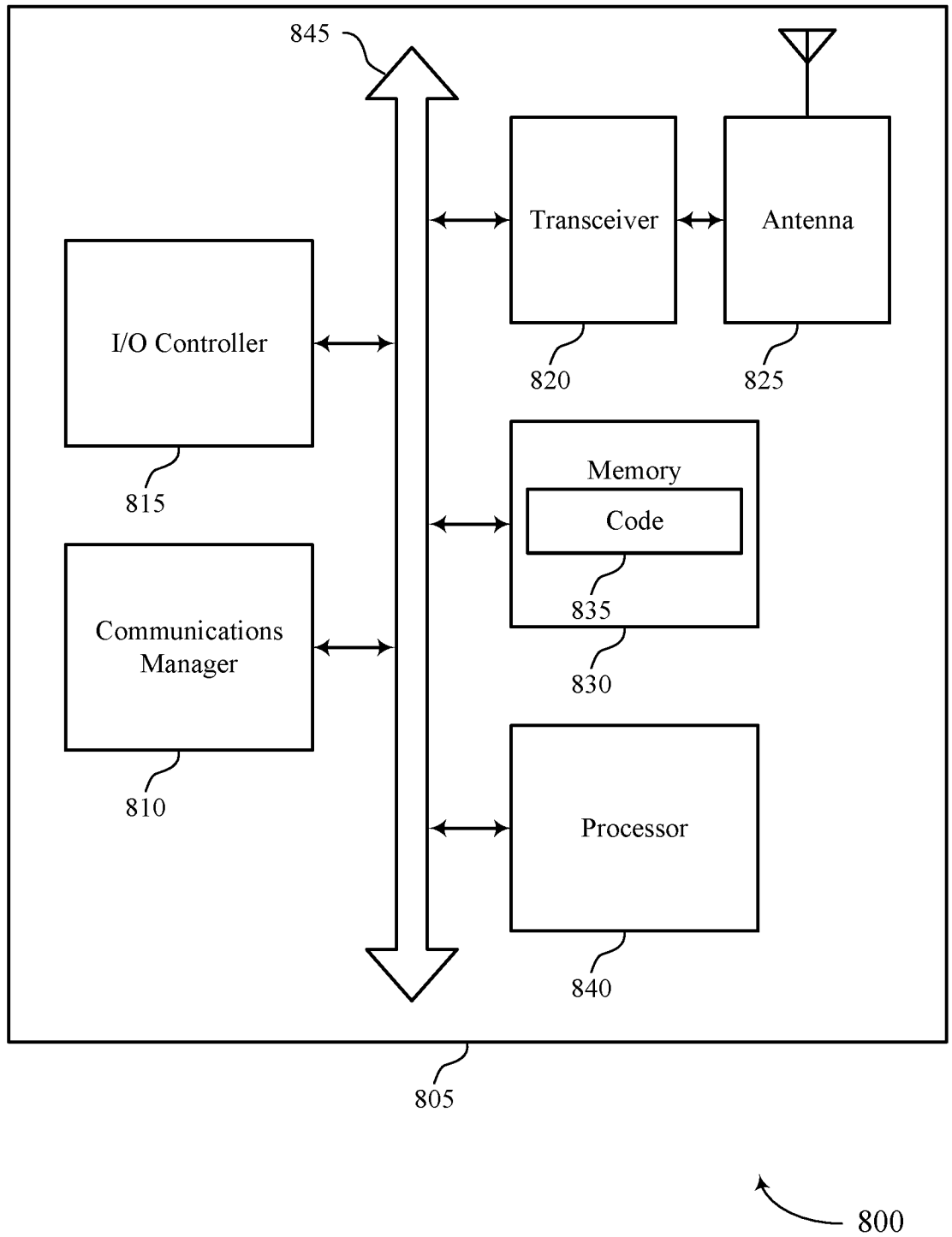
FIG. 8 shows a diagram of a system including a device that supports techniques for RACH-based self-interference measurement in accordance with various aspects of the present disclosure.

FIG. 8 shows a diagram of a system 800 including a device 805 that supports techniques for RACH-based self-interference measurement in accordance with various aspects of the present disclosure. The device 805 may be an example of or include the components of device 505, device 605, or a device (e.g., a base station 105, a UE 115, or both) as described herein. The device 805 may include components for bi-directional voice and data communications including components for transmitting and receiving communications, including a communications manager 810, an I/O controller 815, a transceiver 820, an antenna 825, memory 830, a processor 840, and a coding manager 850. These components may be in electronic communication via one or more buses (e.g., bus 845).

The communications manager 810 may transmit a RACH signal using a transmit beam of a set of transmit beams. The communications manager 810 may receive, based on the transmitted RACH signal, a receive beam of a set of receive beams, and determine a level of self-interference of the received beam. The communications manager 810 may operate in a mode based on the determined level of self-interference. At least one implementation may enable the communications manager 810 to measure self-interference at the device 805 based on at least one transmitted RACH signal (e.g., a RACH preamble) using one or more receive beams of a set of receive beams. Based on implementing the self-interference measurement according to at least one transmitted RACH signal, one or more processors of the device 805 (for example, processor(s) controlling or incorporated with the communications manager 810) may experience reduce power consumption and promote high reliability and low latency wireless communications (for example, full duplex communications), among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor 840 to perform various functions described herein. In some cases, the memory 830 may contain, among other things, a basic I/O system (BIOS) which may control basic hardware or software operation such as the interaction with peripheral components or devices. The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting RACH-based self-interference measurement).

Figure 9:
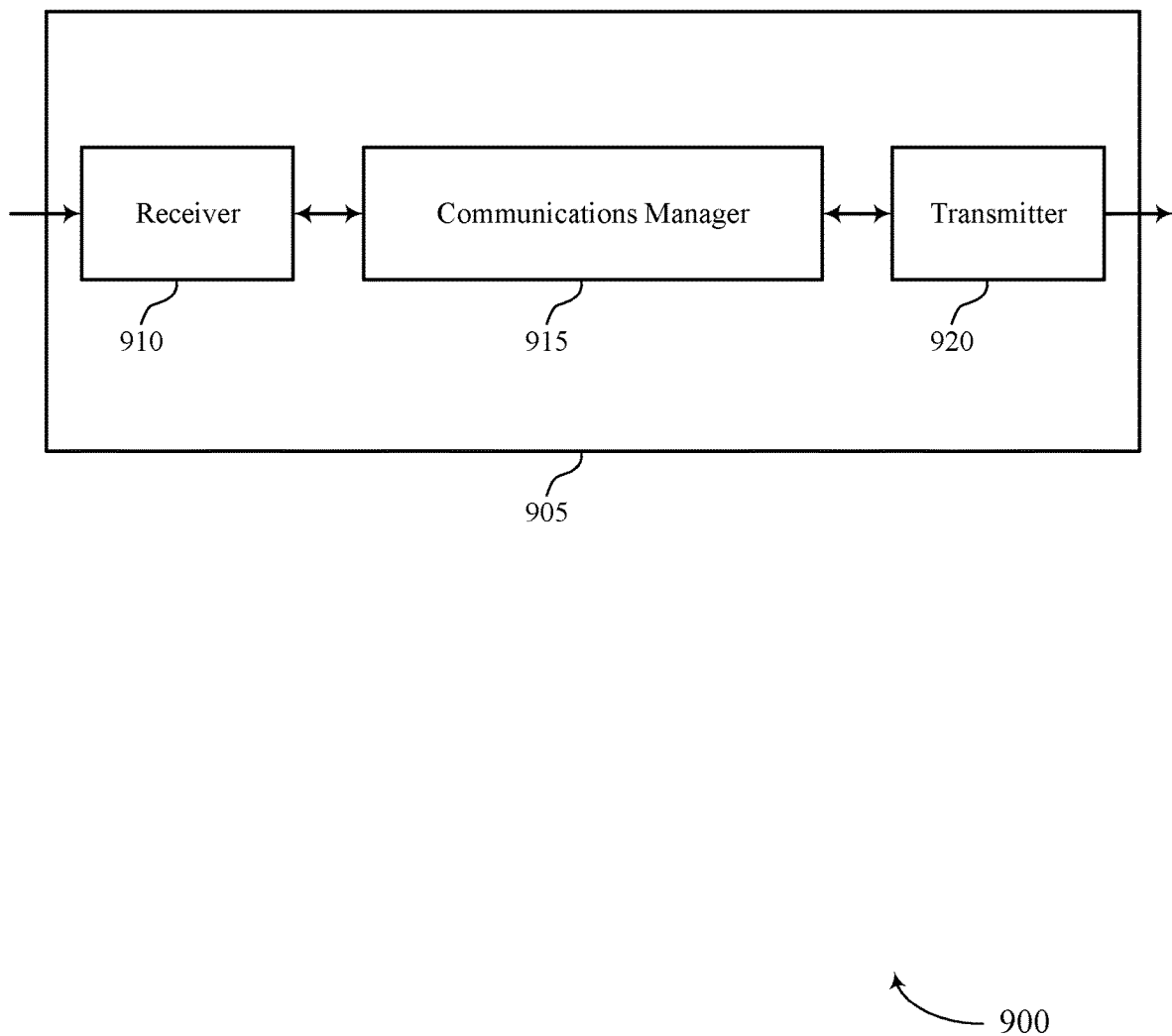
FIGS. 9 and 10 show block diagrams of devices that support techniques for RACH-based self-interference measurement in accordance with various aspects of the present disclosure.

FIG. 9 shows a block diagram 900 of a network device 905 that supports techniques for RACH-based self-interference measurement in accordance with various aspects of the present disclosure. The network device 905 may be an example of aspects of a network device as described herein. The network device 905 may include a receiver 910, a communications manager 915, and a transmitter 920. The network device 905 may also include a processor. Each of these components may be in communication with one another (e.g., via one or more buses).

The receiver 910 may receive information such as packets, user data, or control information associated with various information channels (e.g., control channels, data channels, and information related to RACH-based self-interference measurement, etc.). Information may be passed on to other components of the network device 905. The receiver 910 may be an example of aspects of the transceiver 1220 described with reference to FIG. 12. The receiver 910 may utilize a single antenna or a set of antennas.

The communications manager 915 may determine a RACH configuration for a device to transmit a RACH signal using a transmit beam of a set of transmit beams and determine a level of self-interference of a receive beam of a set of receive beams associated with the device and transmit a message including the RACH configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the network device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
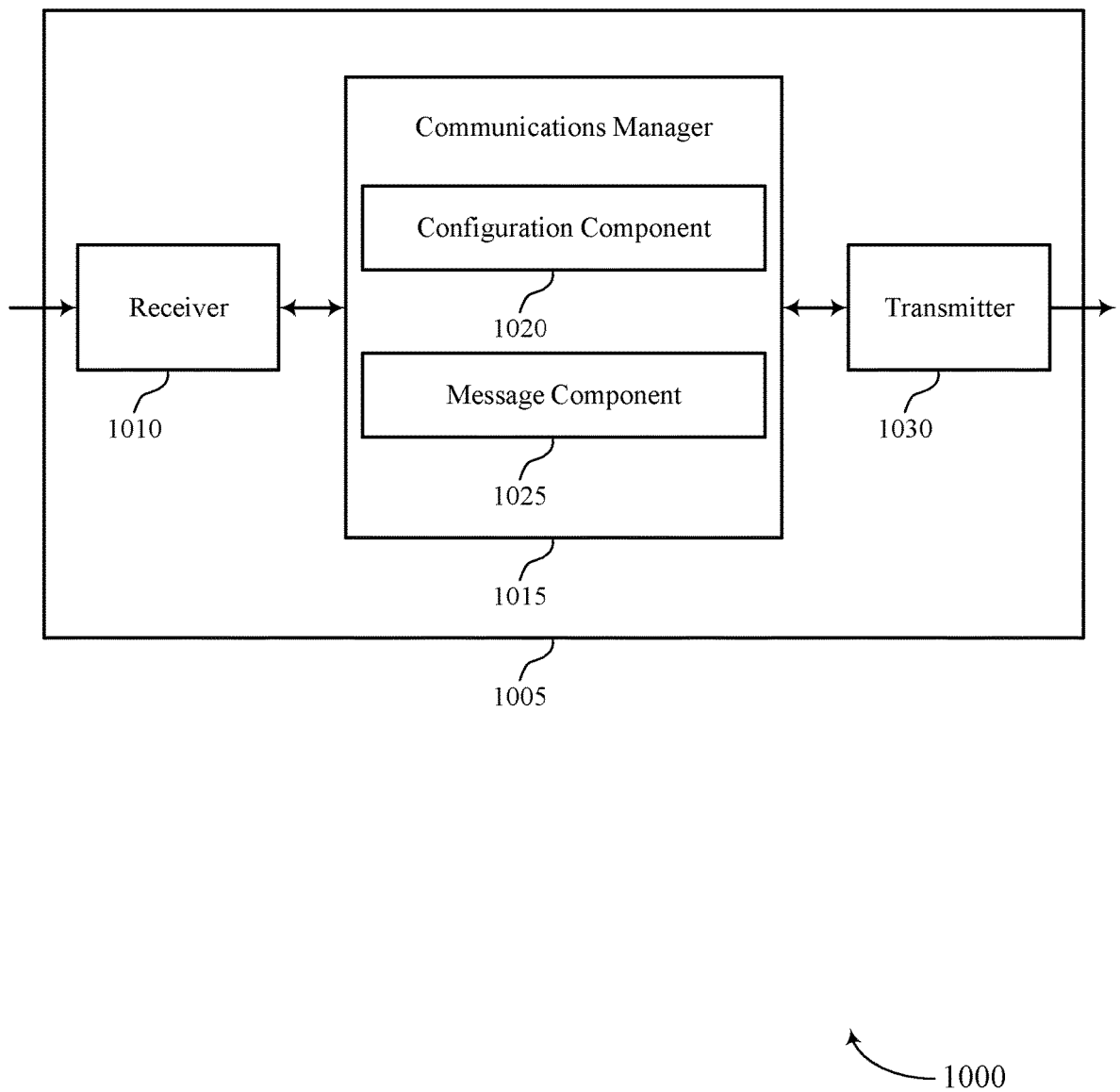

FIG. 10 shows a block diagram 1000 of a network device 1005 that supports techniques for RACH-based self-interference measurement in accordance with various aspects of the present disclosure. The network device 1005 may be an example of aspects of a network device 905 or a base station 105 as described herein. The network device 1005 may include a receiver 1010, a communications manager 1015, and a transmitter 1030. The network device 1005 may also include a processor. Each of these components may be in communication with one another (e.g., via one or more buses).

The receiver 1010 may receive information such as packets, user data, or control information associated with various information channels (e.g., control channels, data channels, and information related to RACH-based self-interference measurement, etc.). Information may be passed on to other components of the network device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration component 1020 and a message component 1025. The communications manager 1015 may be an example of aspects of the communications manager 1210 described herein. The configuration component 1020 may determine a RACH configuration for a device to transmit a RACH signal using a transmit beam of a set of transmit beams and determine a level of self-interference of a receive beam of a set of receive beams associated with the device. The message component 1025 may transmit a message including the RACH configuration.

The transmitter 1030 may transmit signals generated by other components of the network device 1005. In some examples, the transmitter 1030 may be collocated with a receiver 1010 in a transceiver component. For example, the transmitter 1030 may be an example of aspects of the transceiver 1220 described with reference to FIG. 12. The transmitter 1030 may utilize a single antenna or a set of antennas.

Figure 11:
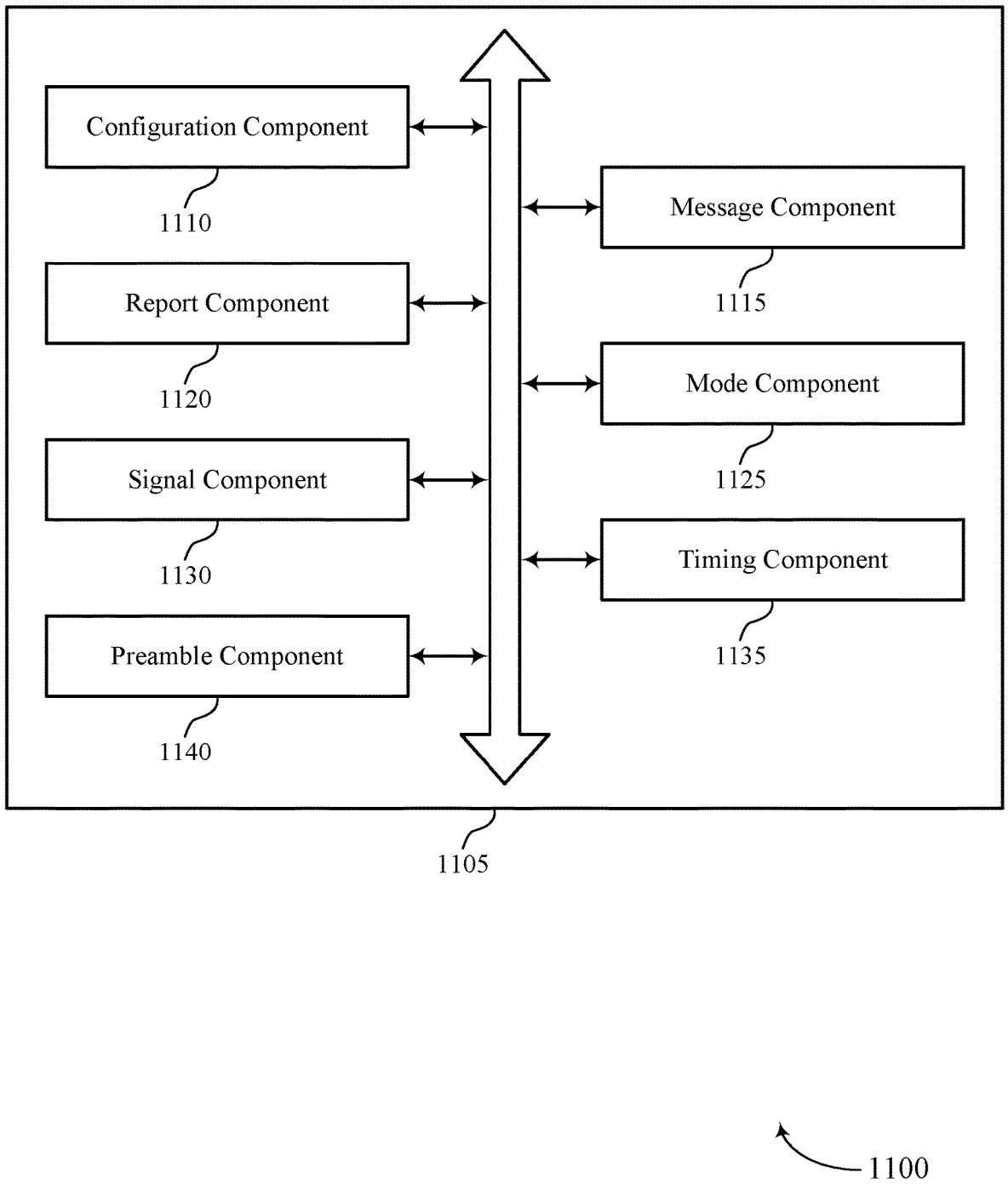
FIG. 11 shows a block diagram of a communications manager that supports techniques for RACH-based self-interference measurement in accordance with various aspects of the present disclosure.

FIG. 11 shows a block diagram 1100 of a communications manager 1105 that supports techniques for RACH-based self-interference measurement in accordance with various aspects of the present disclosure. The communications manager 1105 may be an example of aspects of a communications manager 915, a communications manager 1015, or a communications manager 1210 described herein. The communications manager 1105 may include a configuration component 1110, a message component 1115, a report component 1120, a mode component 1125, a signal component 1130, a timing component 1135, and a preamble component 1140. Each of these components may communicate, directly or indirectly, with one another (e.g., via one or more buses).

The configuration component 1110 may determine a RACH configuration for a device to transmit a RACH signal using a transmit beam of a set of transmit beams and determine a level of self-interference of a receive beam of a set of receive beams associated with the device. The message component 1115 may transmit a message including the RACH configuration. The report component 1120 may receive a report including an indication of the determined level of self-interference of the receive beam of the set of receive beams associated with the device. In some examples, the report component 1120 may receive the report in a RACH payload associated with the RACH signal.

The mode component 1125 may operate in a mode based on the received report including the indication of the determined level of self-interference of the receive beam of the set of receive beams associated with the device. The signal component 1130 may receive the RACH signal from the device using a receive beam of a set of receive beams. In some examples, the signal component 1130 may operate in a mode based on the received RACH signal from the device.

The timing component 1135 may determine a timing advance associated with the RACH configuration based on one or more timing advances associated with one or more uplink transmissions. In some examples, the timing component 1135 may receive the RACH signal using the receive beam of the set of transmit beams based on the timing advance. The preamble component 1140 may allocate a set of preamble identifiers or a set of preamble resources, or both. In some examples, the preamble component 1140 may transmit the message including an indication of the set of preamble identifiers or the set of preamble resources, or both.

Figure 12:
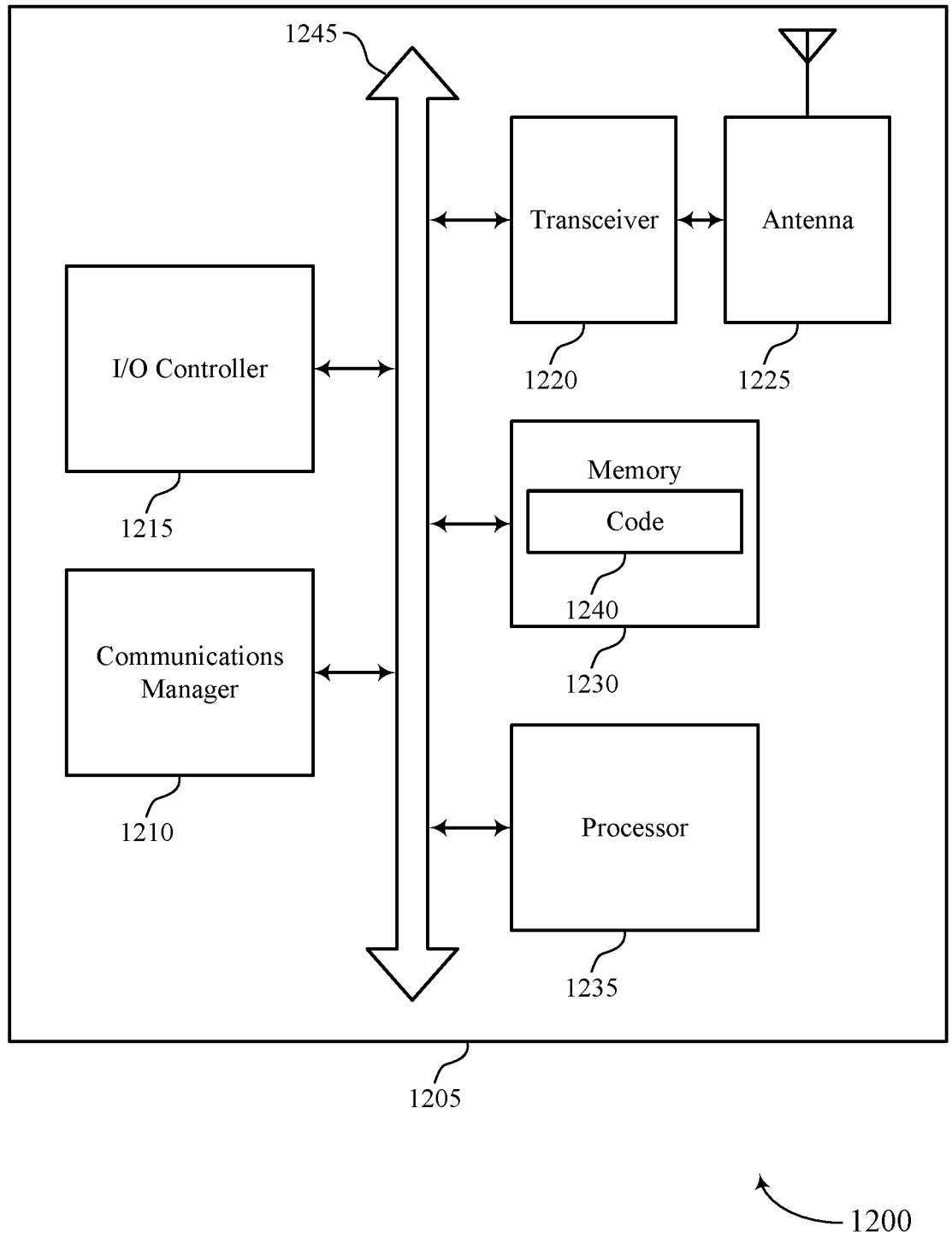
FIG. 12 shows a diagram of a system including a device that supports techniques for RACH-based self-interference measurement in accordance with various aspects of the present disclosure.

FIG. 12 shows a diagram of a system 1200 including a network device 1205 that supports techniques for RACH-based self-interference measurement in accordance with various aspects of the present disclosure. The network device 1205 may be an example of or include the components of network device 905, network device 1005, or a base station 105 as described herein. The network device 1205 may include components for bi-directional voice and data communications including components for transmitting and receiving communications, including a communications manager 1210, an I/O controller 1215, a transceiver 1220, an antenna 1225, memory 1230, and a processor 1235. These components may be in electronic communication via one or more buses (e.g., bus 1245).

The communications manager 1210 may determine a RACH configuration for a device (e.g., a UE 115) to transmit a RACH signal using a transmit beam of a set of transmit beams. The communications manager 1210 may determine a level of self-interference of a receive beam of a set of receive beams associated with the device and transmit a message including the RACH configuration.

The I/O controller 1215 may manage input and output signals for the network device 1205. The I/O controller 1215 may also manage peripherals not integrated into the network device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the network device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the network device 1205 may include a single antenna 1225. However, in some cases, the network device 1205 may have more than one antenna 1225, which may be capable of concurrently transmitting or receiving multiple wireless transmissions.

The memory 1230 may include RAM and ROM. The memory 1230 may store computer-readable, computer-executable code 1240 including instructions that, when executed, cause the processor 1235 to perform various functions described herein. In some cases, the memory 1230 may contain, among other things, a BIOS which may control basic hardware or software operation such as the interaction with peripheral components or devices. The code 1240 may include instructions to implement aspects of the present disclosure, including instructions to support wireless communications. The code 1240 may be stored in a non-transitory computer-readable medium such as system memory or other type of memory. In some cases, the code 1240 may not be directly executable by the processor 1235 but may cause a computer (e.g., when compiled and executed) to perform functions described herein.

The processor 1235 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1235 may be configured to operate a memory array using a memory controller. In other cases, a memory controller may be integrated into the processor 1235. The processor 1235 may be configured to execute computer-readable instructions stored in a memory (e.g., the memory 1230) to cause the network device 1205 to perform various functions (e.g., functions or tasks supporting RACH-based self-interference measurement).

Figure 13:
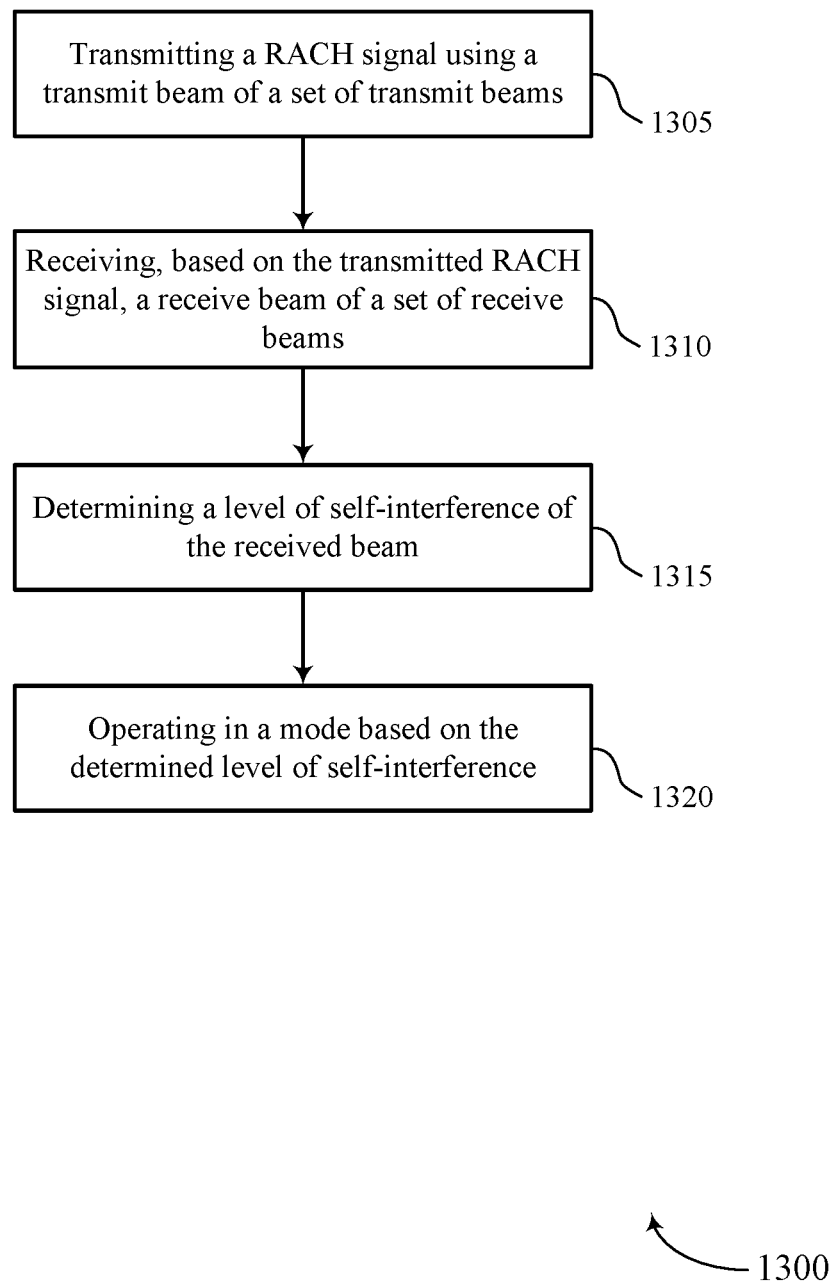
FIGS. 13 through 17 show flowcharts illustrating methods that support techniques for RACH-based self-interference measurement in accordance with various aspects of the present disclosure.

FIG. 13 shows a flowchart illustrating a method 1300 that supports techniques for RACH-based self-interference measurement in accordance with various aspects of the present disclosure. The operations of method 1300 may be implemented by a device or its components as described herein. For example, the operations of method 1300 may be performed by a communications manager as described with reference to FIGS. 5 through 8. In some examples, a device (e.g., a base station 105, a UE 115) may execute a set of instructions to control the functional elements of the device to perform the functions described below. Additionally or alternatively, a device (e.g., a base station 105, a UE 115) may perform aspects of the functions described below using special-purpose hardware.

At 1305, the device may transmit a RACH signal using a transmit beam of a set of transmit beams. The operations of 1305 may be performed according to the methods described herein. In some examples, aspects of the operations of 1305 may be performed by a signal component as described with reference to FIGS. 5 through 8.

At 1310, the device may receive, based on the transmitted RACH signal, a receive beam of a set of receive beams. The operations of 1310 may be performed according to the methods described herein. In some examples, aspects of the operations of 1310 may be performed by a beam component as described with reference to FIGS. 5 through 8.

At 1315, the device may determine a level of self-interference of the received beam. The operations of 1315 may be performed according to the methods described herein. In some examples, aspects of the operations of 1315 may be performed by an interference component as described with reference to FIGS. 5 through 8.

At 1320, the device may operate in a mode based on the determined level of self-interference. The operations of 1320 may be performed according to the methods described herein. In some examples, aspects of the operations of 1320 may be performed by a mode component as described with reference to FIGS. 5 through 8.

Figure 14:
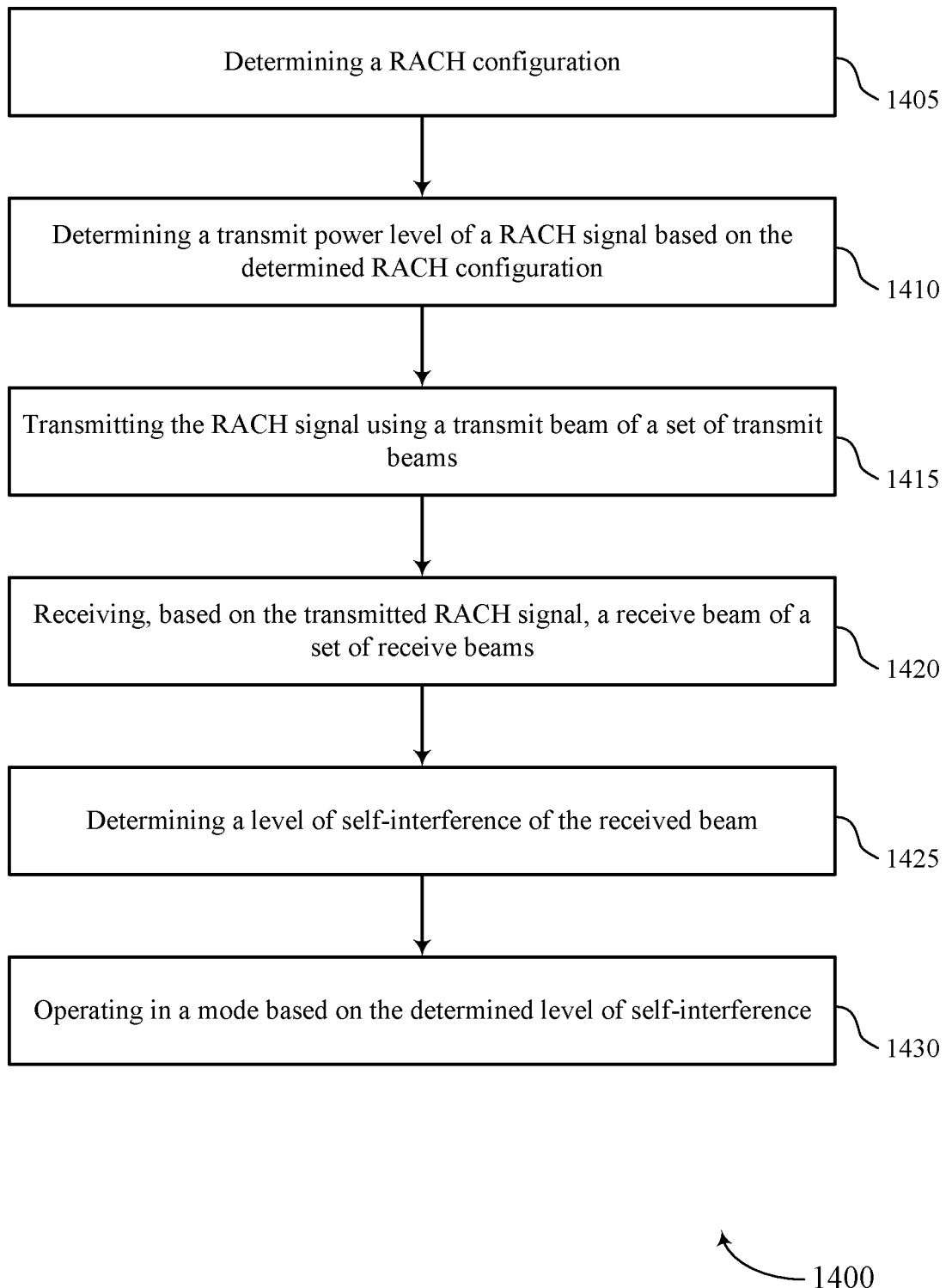

FIG. 14 shows a flowchart illustrating a method 1400 that supports techniques for RACH-based self-interference measurement in accordance with various aspects of the present disclosure. The operations of method 1400 may be implemented by a device or its components as described herein. For example, the operations of method 1400 may be performed by a communications manager as described with reference to FIGS. 5 through 8. In some examples, a device (e.g., a base station 105, a UE 115) may execute a set of instructions to control the functional elements of the device to perform the functions described below. Additionally or alternatively, a device (e.g., a base station 105, a UE 115) may perform aspects of the functions described below using special-purpose hardware.

At 1405, the device may determine a RACH configuration. The operations of 1405 may be performed according to the methods described herein. In some examples, aspects of the operations of 1405 may be performed by a configuration component as described with reference to FIGS. 5 through 8.

At 1410, the device may determine a transmit power level of a RACH signal based on the determined RACH configuration. The operations of 1410 may be performed according to the methods described herein. In some examples, aspects of the operations of 1410 may be performed by a power component as described with reference to FIGS. 5 through 8.

At 1415, the device may transmit the RACH signal using a transmit beam of a set of transmit beams. The operations of 1415 may be performed according to the methods described herein. In some examples, aspects of the operations of 1415 may be performed by a signal component as described with reference to FIGS. 5 through 8.

At 1420, the device may receive, based on the transmitted RACH signal, a receive beam of a set of receive beams. The operations of 1420 may be performed according to the methods described herein. In some examples, aspects of the operations of 1420 may be performed by a beam component as described with reference to FIGS. 5 through 8.

At 1425, the device may determine a level of self-interference of the received beam. The operations of 1425 may be performed according to the methods described herein. In some examples, aspects of the operations of 1425 may be performed by an interference component as described with reference to FIGS. 5 through 8.

At 1430, the device may operate in a mode based on the determined level of self-interference. The operations of 1430 may be performed according to the methods described herein. In some examples, aspects of the operations of 1430 may be performed by a mode component as described with reference to FIGS. 5 through 8.

Figure 15:
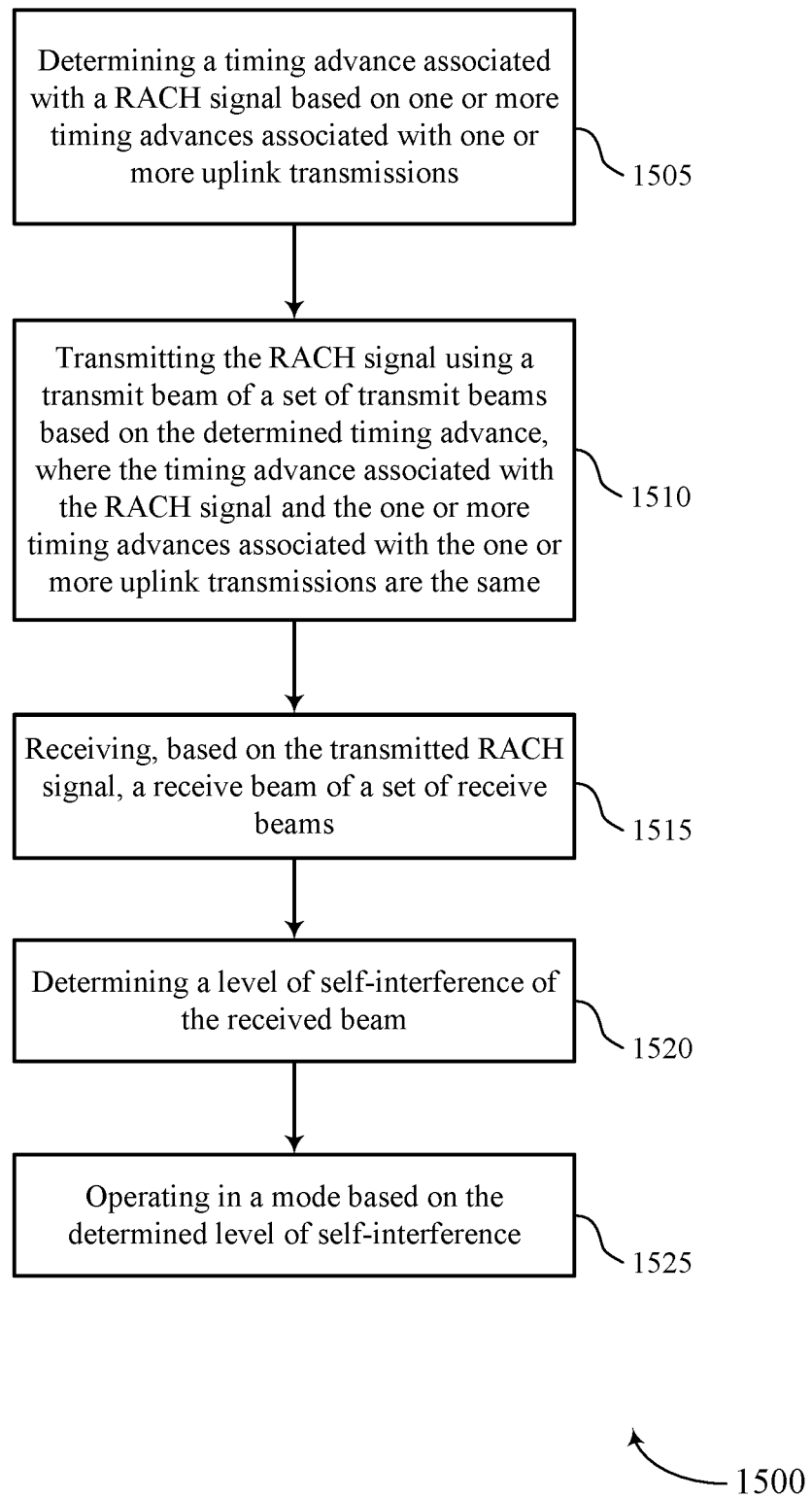

FIG. 15 shows a flowchart illustrating a method 1500 that supports techniques for RACH-based self-interference measurement in accordance with various aspects of the present disclosure. The operations of method 1500 may be implemented by a device or its components as described herein. For example, the operations of method 1500 may be performed by a communications manager as described with reference to FIGS. 5 through 8. In some examples, a device (e.g., a base station 105, a UE 115) may execute a set of instructions to control the functional elements of the device to perform the functions described below. Additionally or alternatively, a device (e.g., a base station 105, a UE 115) may perform aspects of the functions described below using special-purpose hardware.

At 1505, the device may determine a timing advance associated with a RACH signal based on one or more timing advances associated with one or more uplink transmissions. The operations of 1505 may be performed according to the methods described herein. In some examples, aspects of the operations of 1505 may be performed by a timing component as described with reference to FIGS. 5 through 8.

At 1510, the device may transmit the RACH signal using a transmit beam of a set of transmit beams based on the determined timing advance, where the timing advance associated with the RACH signal and the one or more timing advances associated with the one or more uplink transmissions are the same. The operations of 1510 may be performed according to the methods described herein. In some examples, aspects of the operations of 1510 may be performed by a signal component as described with reference to FIGS. 5 through 8.

At 1515, the device may receive, based on the transmitted RACH signal, a receive beam of a set of receive beams. The operations of 1515 may be performed according to the methods described herein. In some examples, aspects of the operations of 1515 may be performed by a beam component as described with reference to FIGS. 5 through 8.

At 1520, the device may determine a level of self-interference of the received beam. The operations of 1520 may be performed according to the methods described herein. In some examples, aspects of the operations of 1520 may be performed by an interference component as described with reference to FIGS. 5 through 8.

At 1525, the device may operate in a mode based on the determined level of self-interference. The operations of 1525 may be performed according to the methods described herein. In some examples, aspects of the operations of 1525 may be performed by a mode component as described with reference to FIGS. 5 through 8.

Figure 16:
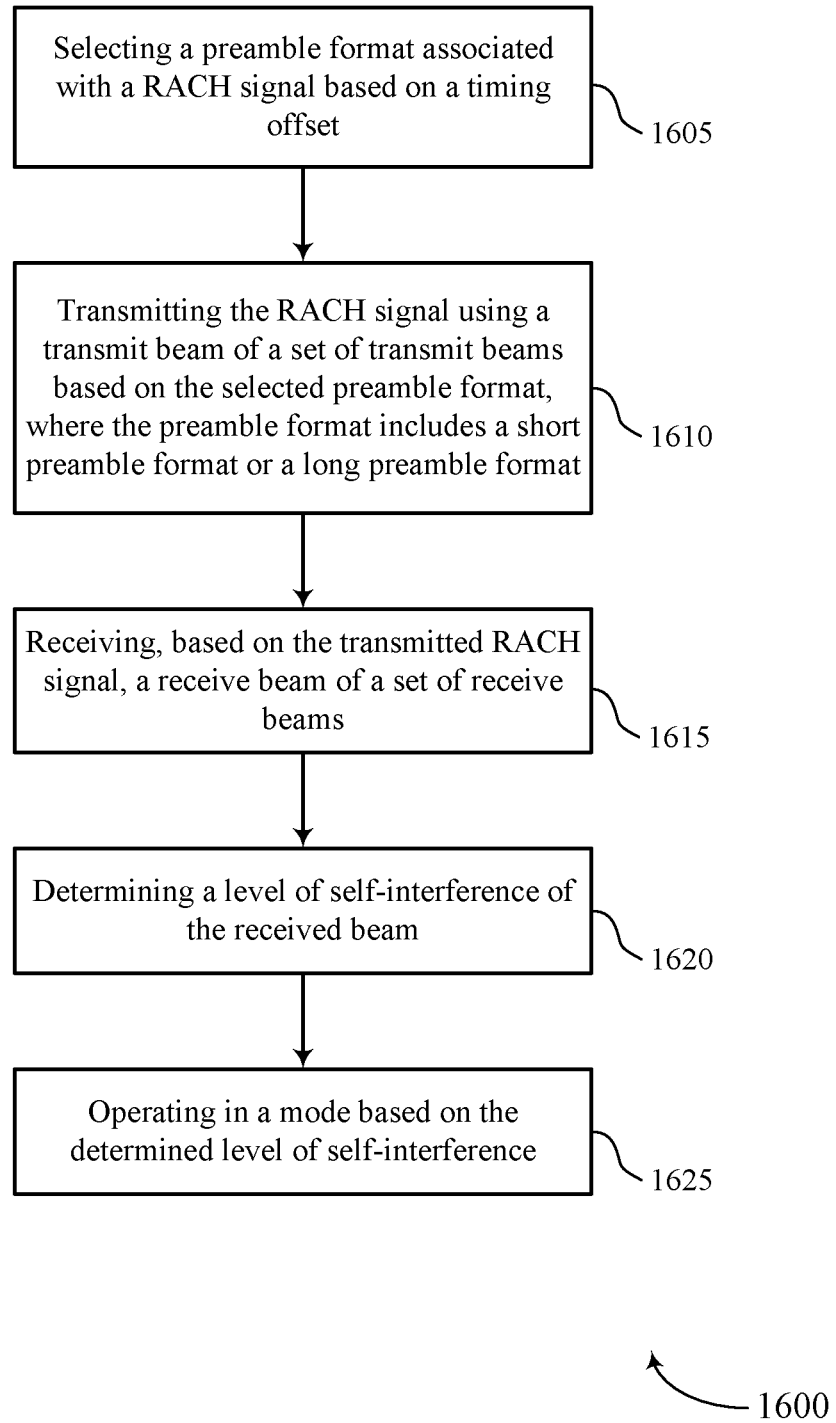

FIG. 16 shows a flowchart illustrating a method 1600 that supports techniques for RACH-based self-interference measurement in accordance with various aspects of the present disclosure. For example, the operations of method 1600 may be performed by a communications manager as described with reference to FIGS. 5 through 8. In some examples, a device (e.g., a base station 105, a UE 115) may execute a set of instructions to control the functional elements of the device to perform the functions described below. Additionally or alternatively, a device (e.g., a base station 105, a UE 115) may perform aspects of the functions described below using special-purpose hardware.

At 1605, the device may select a preamble format associated with a RACH signal based on a timing offset. The operations of 1605 may be performed according to the methods described herein. In some examples, aspects of the operations of 1605 may be performed by a preamble component as described with reference to FIGS. 5 through 8.

At 1610, the device may transmit the RACH signal using a transmit beam of a set of transmit beams based on the selected preamble format, where the preamble format includes a short preamble format or a long preamble format. The operations of 1610 may be performed according to the methods described herein. In some examples, aspects of the operations of 1610 may be performed by a signal component as described with reference to FIGS. 5 through 8.

At 1615, the device may receive, based on the transmitted RACH signal, a receive beam of a set of receive beams. The operations of 1615 may be performed according to the methods described herein. In some examples, aspects of the operations of 1615 may be performed by a beam component as described with reference to FIGS. 5 through 8.

At 1620, the device may determine a level of self-interference of the received beam. The operations of 1620 may be performed according to the methods described herein. In some examples, aspects of the operations of 1620 may be performed by an interference component as described with reference to FIGS. 5 through 8.

At 1625, the device may operate in a mode based on the determined level of self-interference. The operations of 1625 may be performed according to the methods described herein. In some examples, aspects of the operations of 1625 may be performed by a mode component as described with reference to FIGS. 5 through 8.

Figure 17:
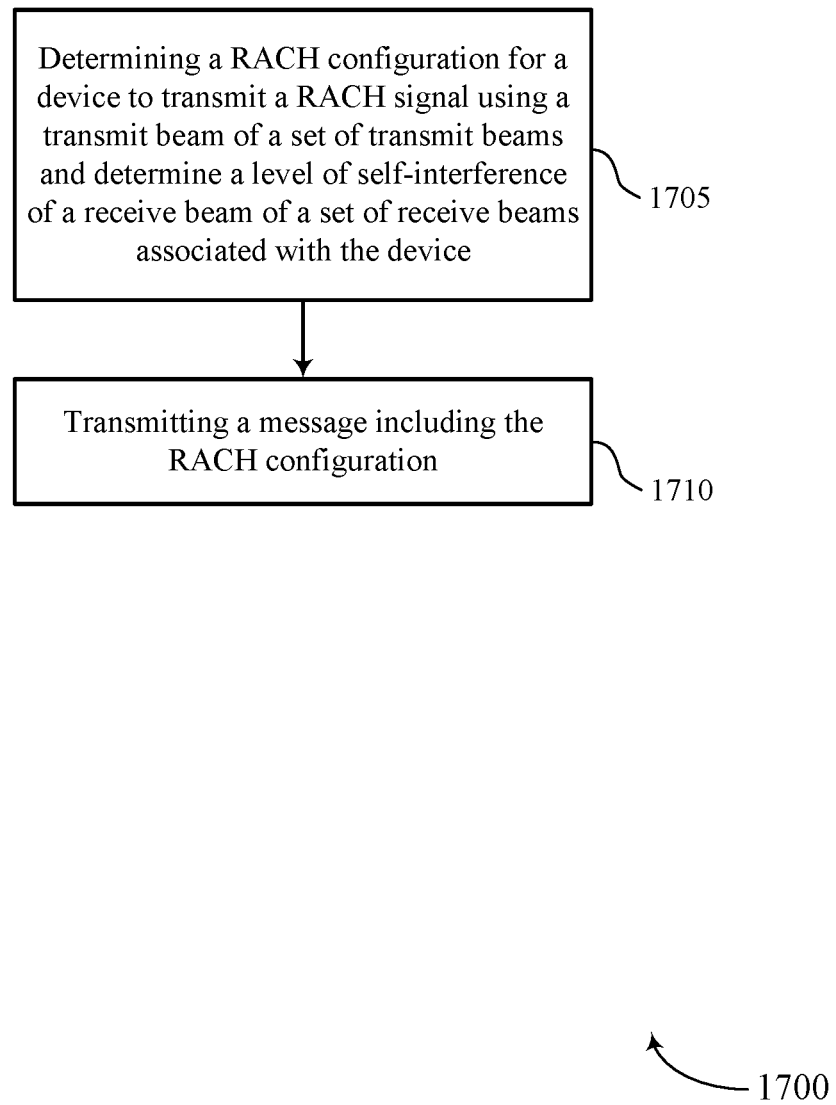

FIG. 17 shows a flowchart illustrating a method 1700 that supports techniques for RACH-based self-interference measurement in accordance with various aspects of the present disclosure. The operations of method 1700 may be implemented by a network device or its components as described herein. For example, the operations of method 1700 may be performed by a communications manager as described with reference to FIGS. 9 through 12. In some examples, a network device may execute a set of instructions to control the functional elements of the network device to perform the functions described below. Additionally or alternatively, a network device may perform aspects of the functions described below using special-purpose hardware.

At 1705, the network device may determine a RACH configuration for a device to transmit a RACH signal using a transmit beam of a set of transmit beams and determine a level of self-interference of a receive beam of a set of receive beams associated with the device. The operations of 1705 may be performed according to the methods described herein. In some examples, aspects of the operations of 1705 may be performed by a configuration component as described with reference to FIGS. 9 through 12.

At 1710, the network device may transmit a message including the RACH configuration. The operations of 1710 may be performed according to the methods described herein. In some examples, aspects of the operations of 1710 may be performed by a message component as described with reference to FIGS. 9 through 12.

The following provides an overview of aspects of the present disclosure:

Aspect 1: A method for wireless communication at a device, comprising: transmitting a RACH signal using a transmit beam of a set of transmit beams; receiving, based at least in part on the transmitted RACH signal, a receive beam of a set of receive beams; determining a level of self-interference of the received beam; and operating in a mode based at least in part on the determined level of self-interference.

Aspect 2: The method of aspect 1, further comprising: determining a RACH configuration, wherein determining the level of self-interference comprises: determining the level of self-interference of the received beam based at least in part on the RACH configuration.

Aspect 3: The method of aspect 2, further comprising: receiving from a network device a message including the RACH configuration, wherein determining the level of self-interference comprises: determining the level of self-interference of the received beam based at least in part on the received message from the network device.

Aspect 4: The method of any of aspects 2 through 3, further comprising: determining a transmit power level of the RACH signal based at least in part on the RACH configuration, wherein transmitting the RACH signal comprises: transmitting the RACH signal using the transmit beam of the set of transmit beams based at least in part on the determined transmit power level of the RACH signal.

Aspect 5: The method of any of aspects 1 through 4, further comprising: determining a timing advance associated with the RACH signal based at least in part on one or more timing advances associated with one or more uplink transmissions, wherein transmitting the RACH signal comprises: transmitting the RACH signal using the transmit beam of the set of transmit beams based at least in part on the timing advance, wherein the timing advance associated with the RACH signal and the one or more timing advances associated with the one or more uplink transmissions are the same.

Aspect 6: The method of any of aspects 1 through 5, further comprising: receiving a message including an indication of a timing advance associated with the RACH signal, wherein transmitting the RACH signal comprises: transmitting the RACH signal using the transmit beam of the set of transmit beams based at least in part on the timing advance indicated in the received message, wherein the timing advance associated with the RACH signal is different from one or more timing advances associated with one or more uplink transmissions.

Aspect 7: The method of any of aspects 1 through 6, further comprising: selecting a preamble format associated with the RACH signal based at least in part on a timing offset, wherein transmitting the RACH signal comprises: transmitting the RACH signal using the transmit beam of the set of transmit beams based at least in part on the selected preamble format, wherein the preamble format includes a short preamble format or a long preamble format.

Aspect 8: The method of any of aspects 1 through 7, further comprising: receiving a message including an indication of a set of preamble identifiers or a set of preamble resources, or both, the set of preamble resources are associated with one or more reference signals, the one or more reference signals including one or more of an SSB, an uplink reference signal, or a downlink reference signal; selecting a preamble identifier of the set of preamble identifiers or a preamble resource of the set of preamble resources, or both, based at least in part on the received message, wherein transmitting the RACH signal comprises: transmitting the RACH signal using the transmit beam of the set of transmit beams based at least in part on the selected preamble identifier or the selected preamble resource, or both, wherein the RACH signal includes a RACH preamble associated with the selected preamble identifier.

Aspect 9: The method of aspect 8, wherein selecting the preamble identifier of the set of preamble identifiers or the preamble resource of the set of preamble resources, or both, comprises: randomly selecting the preamble identifier of the set of preamble identifiers or the preamble resource of the set of preamble resources, or both.

Aspect 10: The method of any of aspects 8 through 9, wherein selecting the preamble identifier of the set of preamble identifiers or the preamble resource of the set of preamble resources, or both, comprises: selecting the preamble identifier of the set of preamble identifiers or the preamble resource of the set of preamble resources, or both, based at least in part on a criteria.

Aspect 11: The method of any of aspects 8 through 10, further comprising: selecting a subset of preamble resources of the set of preamble resources; ramping a transmit power level of the RACH signal over one or more RACH periods based at least in part on the selected subset of preamble resources of the set of preamble resources, wherein transmitting the RACH signal comprises: transmitting the RACH signal using the transmit beam of the set of transmit beams based at least in part on ramping the transmit power level of the RACH signal over the one or more RACH periods.

Aspect 12: The method of any of aspects 1 through 11, further comprising: selecting the transmit beam and the receive beam based at least in part on determining a quasi-co location relationship between the transmit beam and the receive beam, wherein transmitting the RACH signal comprises: transmitting the RACH signal using the transmit beam of the set of transmit beams based at least in part on the determined quasi-co location relationship, wherein determining the level of self-interference comprises: determining the level of self-interference of the received beam based at least in part on the determined quasi-co location relationship.

Aspect 13: The method of any of aspects 1 through 12, further comprising: receiving a reference signal using the receive beam of the set of receive beams; determining a transmit power level of the RACH signal based at least in part on the received reference signal, wherein transmitting the RACH signal comprises: transmitting the RACH signal using the transmit beam of the set of transmit beams based at least in part on the determined transmit power level of the RACH signal.

Aspect 14: The method of any of aspects 1 through 13, further comprising: receiving a plurality of reference signals using the set of receive beams; determining a transmit power level of each RACH signal of a set of RACH signals for each receive beam of the set of receive beams based at least in part on the received plurality of reference signals, wherein transmitting the RACH signal comprises: transmitting the set of RACH signals using the set of transmit beams based at least in part on the determined transmit power level of each RACH signal of the set of RACH signals.

Aspect 15: The method of aspect 14, wherein determining the level of self-interference comprises: determining the level of self-interference of the received beam based at least in part on the transmitted set of RACH signals using the set of receive beams, wherein operating in the mode comprises: operating in the mode based at least in part on the determined level of self-interference based at least in part on the transmitted set of RACH signals using the set of receive beams.

Aspect 16: The method of any of aspects 1 through 15, further comprising: receiving a message including an indication of a set of preamble resources, the set of preamble resources including a set of common preamble resources for determining the level of self-interference at the device and at least one other device, wherein determining the level of self-interference comprises: determining the level of self-interference of the received beam based at least in part on the set of common preamble resources.

Aspect 17: The method of any of aspects 1 through 16, further comprising: determining an additional RACH configuration; and performing at least one RACH operation different from determining the level of self-interference based at least in part on the additional RACH configuration, wherein the at least one RACH operation includes an initial access operation, a system information request operation, or a beam management operation.

Aspect 18: The method of any of aspects 1 through 17, further comprising: receiving from a network device a SIB message including a RACH configuration, wherein determining the level of self-interference comprises: determining the level of self-interference of the received beam based at least in part on the received SIB message including the RACH configuration.

Aspect 19: The method of any of aspects 1 through 18, further comprising: determining a set of RACH occasions or a set of RACH periods, or both, based at least in part on a RACH configuration, wherein determining the level of self-interference comprises: determining the level of self-interference of the received beam based at least in part on the set of RACH occasions or the set of RACH periods, or both.

Aspect 20: The method of any of aspects 1 through 19, further comprising: allocating a set of preamble identifiers or a set of preamble resources, or both; and transmitting a message including an indication of the set of preamble identifiers or the set of preamble resources, or both.

Aspect 21: The method of any of aspects 1 through 20, further comprising: transmitting a report including an indication of the determined level of self-interference of the received beam, wherein operating in the mode comprises: operating in the mode based at least in part on the transmitted report including the indication of the determined level of self-interference of the received beam.

Aspect 22: The method of aspect 21, wherein transmitting the report comprises: transmitting the report in a RACH payload associated with the RACH signal.

Aspect 23: The method of any of aspects 1 through 22, wherein the wireless communication comprises full duplex communication.

Aspect 24: A method for wireless communication at a network device, comprising: determining a RACH configuration for a device to transmit a RACH signal using a transmit beam of a set of transmit beams and determine a level of self-interference of a receive beam of a set of receive beams associated with the device; and transmitting a message including the RACH configuration.

Aspect 25: The method of aspect 24, further comprising: receiving a report including an indication of the determined level of self-interference of the receive beam of the set of receive beams associated with the device; and operating in a mode based at least in part on the received report including the indication of the determined level of self-interference of the receive beam of the set of receive beams associated with the device.

Aspect 26: The method of aspect 25, wherein receiving the report comprises: receiving the report in a RACH payload associated with the RACH signal.

Aspect 27: The method of any of aspects 24 through 26, further comprising: receiving the RACH signal from the device using a receive beam of a set of receive beams; and operating in a mode based at least in part on the received RACH signal from the device.

Aspect 28: The method of aspect 27, further comprising: determining a timing advance associated with the RACH configuration based at least in part on one or more timing advances associated with one or more uplink transmissions, wherein receiving the RACH signal comprises: receiving the RACH signal using the receive beam of the set of transmit beams based at least in part on the timing advance.

Aspect 29: The method of any of aspects 24 through 28, further comprising: allocating a set of preamble identifiers or a set of preamble resources, or both, wherein transmitting the message comprises: transmitting the message including an indication of the set of preamble identifiers or the set of preamble resources, or both.

Aspect 30: An apparatus for wireless communication at a device, comprising a processor; memory coupled with the processor; and instructions stored in the memory and executable by the processor to cause the apparatus to perform a method of any of aspects 1 through 23.

Aspect 31: An apparatus for wireless communication at a device, comprising at least one means for performing a method of any of aspects 1 through 23.

Aspect 32: A non-transitory computer-readable medium storing code for wireless communication at a device, the code comprising instructions executable by a processor to perform a method of any of aspects 1 through 23.

Aspect 33: An apparatus for wireless communication at a network device, comprising a processor; memory coupled with the processor; and instructions stored in the memory and executable by the processor to cause the apparatus to perform a method of any of aspects 24 through 29.

Aspect 34: An apparatus for wireless communication at a network device, comprising at least one means for performing a method of any of aspects 24 through 29.

Aspect 35: A non-transitory computer-readable medium storing code for wireless communication at a network device, the code comprising instructions executable by a processor to perform a method of any of aspects 24 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the present disclosure may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the present disclosure. These techniques, however, may be practiced without these specific details. In some instances, known structures and devices are shown in block diagram form in order to avoid obscuring the concepts of the present disclosure.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope with the principles and novel features disclosed herein.

What is claimed is:

1. A method for wireless communication at a device, comprising:
    selecting a preamble format associated with a random access channel signal based at least in part on a timing offset, wherein the preamble format includes a short preamble format or a long preamble format;
    transmitting the random access channel signal using a transmit beam of a set of transmit beams based at least in part on the selected preamble format,
    receiving, based at least in part on the transmitted random access channel signal, a receive beam of a set of receive beams;
    determining a level of self-interference of the received beam; and
    operating in a half-duplex communications mode or a full-duplex communications mode based at least in part on the determined level of self-interference.

2. The method of claim 1, further comprising:
    determining a random access channel configuration, wherein determining the level of self-interference comprises:
    determining the level of self-interference of the received beam based at least in part on the random access channel configuration.

3. The method of claim 2, further comprising:
    receiving, from a network device, a message including the random access channel configuration, wherein determining the level of self-interference comprises:
    determining the level of self-interference of the received beam based at least in part on the received message from the network device.

4. The method of claim 2, further comprising:
    determining a transmit power level of the random access channel signal based at least in part on the random access channel configuration, wherein transmitting the random access channel signal comprises:
    transmitting the random access channel signal using the transmit beam of the set of transmit beams based at least in part on the determined transmit power level of the random access channel signal.

5. The method of claim 2, further comprising:
    determining an additional random access channel configuration; and
    performing at least one random access channel operation different from determining the level of self-interference based at least in part on the additional random access channel configuration, wherein the at least one random access channel operation includes an initial access operation, a system information request operation, or a beam management operation.

6. The method of claim 1, further comprising:
    determining a timing advance associated with the random access channel signal based at least in part on one or more timing advances associated with one or more uplink transmissions, wherein transmitting the random access channel signal comprises:
    transmitting the random access channel signal using the transmit beam of the set of transmit beams based at least in part on the timing advance, wherein the timing advance associated with the random access channel signal and the one or more timing advances associated with the one or more uplink transmissions are a same timing advance.

7. The method of claim 1, further comprising:
    receiving a message including an indication of a timing advance associated with the random access channel signal, wherein transmitting the random access channel signal comprises:
    transmitting the random access channel signal using the transmit beam of the set of transmit beams based at least in part on the timing advance indicated in the received message, wherein the timing advance associated with the random access channel signal is different from one or more timing advances associated with one or more uplink transmissions.

8. The method of claim 1, further comprising:
    receiving a message including an indication of a set of preamble identifiers or a set of preamble resources, or both, the set of preamble resources are associated with one or more reference signals, the one or more reference signals including one or more of a synchronization signal block, an uplink reference signal, or a downlink reference signal; and
    selecting a preamble identifier of the set of preamble identifiers or a preamble resource of the set of preamble resources, or both, based at least in part on the received message, wherein transmitting the random access channel signal comprises:
    transmitting the random access channel signal using the transmit beam of the set of transmit beams based at least in part on the selected preamble identifier or the selected preamble resource, or both, wherein the random access channel signal includes a random access channel preamble associated with the selected preamble identifier.

9. The method of claim 8, wherein selecting the preamble identifier of the set of preamble identifiers or the preamble resource of the set of preamble resources, or both, comprises:
randomly selecting the preamble identifier of the set of preamble identifiers or the preamble resource of the set of preamble resources, or both.

10. The method of claim 8, wherein selecting the preamble identifier of the set of preamble identifiers or the preamble resource of the set of preamble resources, or both, comprises:
selecting the preamble identifier of the set of preamble identifiers or the preamble resource of the set of preamble resources, or both, based at least in part on a criteria.

11. The method of claim 8, further comprising:
selecting a subset of preamble resources of the set of preamble resources; and
ramping a transmit power level of the random access channel signal over one or more random access channel periods based at least in part on the selected subset of preamble resources of the set of preamble resources, wherein transmitting the random access channel signal comprises:
transmitting the random access channel signal using the transmit beam of the set of transmit beams based at least in part on ramping the transmit power level of the random access channel signal over the one or more random access channel periods.

12. The method of claim 1, further comprising:
selecting the transmit beam and the receive beam based at least in part on determining a quasi-co location relationship between the transmit beam and the receive beam, wherein transmitting the random access channel signal comprises:
transmitting the random access channel signal using the transmit beam of the set of transmit beams based at least in part on the determined quasi-co location relationship, wherein determining the level of self-interference comprises:
determining the level of self-interference of the received beam based at least in part on the determined quasi-co location relationship.

13. The method of claim 1, further comprising:
receiving a reference signal using the receive beam of the set of receive beams; and
determining a transmit power level of the random access channel signal based at least in part on the received reference signal, wherein transmitting the random access channel signal comprises:
transmitting the random access channel signal using the transmit beam of the set of transmit beams based at least in part on the determined transmit power level of the random access channel signal.

14. The method of claim 1, further comprising:
receiving a plurality of reference signals using the set of receive beams; and
determining a transmit power level of each random access channel signal of a set of random access channel signals for each receive beam of the set of receive beams based at least in part on the received plurality of reference signals, wherein transmitting the random access channel signal comprises:

transmitting the set of random access channel signals using the set of transmit beams based at least in part on the determined transmit power level of each random access channel signal of the set of random access channel signals.

15. The method of claim 14, wherein determining the level of self-interference comprises:
determining the level of self-interference of the received beam based at least in part on the transmitted set of random access channel signals using the set of receive beams, wherein operating in the half-duplex communications mode or the full-duplex communications mode comprises:
operating in the half-duplex communications mode or the full-duplex communications mode based at least in part on the determined level of self-interference based at least in part on the transmitted set of random access channel signals using the set of receive beams.

16. The method of claim 1, further comprising:
receiving a message including an indication of a set of preamble resources, the set of preamble resources including a set of common preamble resources for determining the level of self-interference at the device and at least one other device, wherein determining the level of self-interference comprises:
determining the level of self-interference of the received beam based at least in part on the set of common preamble resources.

17. The method of claim 1, further comprising:
receiving, from a network device, a system information block message including a random access channel configuration, wherein determining the level of self-interference comprises:
determining the level of self-interference of the received beam based at least in part on the received system information block message including the random access channel configuration.

18. The method of claim 1, further comprising:
determining a set of random access channel occasions or a set of random access channel periods, or both, based at least in part on a random access channel configuration, wherein determining the level of self-interference comprises:
determining the level of self-interference of the received beam based at least in part on the set of random access channel occasions or the set of random access channel periods, or both.

19. The method of claim 1, further comprising:
allocating a set of preamble identifiers or a set of preamble resources, or both; and
transmitting a message including an indication of the set of preamble identifiers or the set of preamble resources, or both.

20. The method of claim 1, further comprising:
transmitting a report including an indication of the determined level of self-interference of the received beam, wherein operating in the half-duplex communications mode or the full-duplex communications mode comprises:
operating in the half-duplex communications mode or the full-duplex communications mode based at least in part on the transmitted report including the indication of the determined level of self-interference of the received beam.

21. The method of claim 20, wherein transmitting the report comprises:
   transmitting the report in a random access channel payload associated with the random access channel signal.

22. A method for wireless communication at a network device, comprising:
   determining a random access channel configuration for a device to transmit a random access channel signal using a transmit beam of a set of transmit beams and determine a level of self-interference of a receive beam of a set of receive beams associated with the device, wherein the level of self-interference is associated with the network device operating in a half-duplex communications mode or a full-duplex communications mode, and wherein the random access channel signal is associated with a preamble format based at least in part on a timing offset, the preamble format including a short preamble format or a long preamble format; and
   transmitting a message including the random access channel configuration.

23. The method of claim 22, further comprising:
   receiving a report including an indication of the determined level of self-interference of the receive beam of the set of receive beams associated with the device; and
   operating in a mode based at least in part on the received report including the indication of the determined level of self-interference of the receive beam of the set of receive beams associated with the device.

24. The method of claim 23, wherein receiving the report comprises:
   receiving the report in a random access channel payload associated with the random access channel signal.

25. The method of claim 22, further comprising:
   receiving the random access channel signal from the device using a receive beam of a set of receive beams; and
   operating in the half-duplex communications mode or the full-duplex communications mode based at least in part on the received random access channel signal from the device.

26. The method of claim 25, further comprising:
   determining a timing advance associated with the random access channel configuration based at least in part on one or more timing advances associated with one or more uplink transmissions, wherein receiving the random access channel signal comprises:
   receiving the random access channel signal using the receive beam of the set of transmit beams based at least in part on the timing advance.

27. The method of claim 22, further comprising:
   allocating a set of preamble identifiers or a set of preamble resources, or both, wherein transmitting the message comprises:
   transmitting the message including an indication of the set of preamble identifiers or the set of preamble resources, or both.

28. An apparatus for wireless communication, comprising:
   a processor;
   memory coupled with the processor; and
   instructions stored in the memory and executable by the processor to cause the apparatus to:
   select a preamble format associated with a random access channel signal based at least in part on a timing offset, wherein the preamble format includes a short preamble format or a long preamble format;
   transmit the random access channel signal using a transmit beam of a set of transmit beams based at least in part on the selected preamble format,
   receive, based at least in part on the transmitted random access channel signal, a receive beam of a set of receive beams;
   determine a level of self-interference of the received beam; and
   operate in a half-duplex communications mode or a full-duplex communications mode based at least in part on the determined level of self-interference.

29. An apparatus for wireless communication, comprising:
   a processor;
   memory coupled with the processor; and
   instructions stored in the memory and executable by the processor to cause the apparatus to:
   determine a random access channel configuration for a device to transmit a random access channel signal using a transmit beam of a set of transmit beams and determine a level of self-interference of a receive beam of a set of receive beams associated with the device, wherein the level of self-interference is associated with a network device operating in a half-duplex communications mode or a full-duplex communications mode, and wherein the random access channel signal is associated with a preamble format based at least in part on a timing offset, the preamble format including a short preamble format or a long preamble format; and
   transmit a message including the random access channel configuration.

* * * * *